United States Patent
Yamanouchi

(10) Patent No.: US 9,586,375 B2
(45) Date of Patent: Mar. 7, 2017

(54) PRESS MACHINE CONTROLLER

(71) Applicant: AIDA ENGINEERING, LTD., Sagamihara-shi, Kanagawa (JP)

(72) Inventor: Akira Yamanouchi, Sagamihara (JP)

(73) Assignee: AIDA ENGINEERING, LTD., Sagamihara-Shi, Kanagawa (PA)

( * ) Notice: Subject to any disclaimer, the term of this patent is extended or adjusted under 35 U.S.C. 154(b) by 752 days.

(21) Appl. No.: 13/935,467

(22) Filed: Jul. 3, 2013

(65) Prior Publication Data

US 2015/0007627 A1  Jan. 8, 2015

(51) Int. Cl.
| | |
|---|---|
| *B30B 15/26* | (2006.01) |
| *B30B 15/14* | (2006.01) |
| *B30B 15/00* | (2006.01) |
| *B21D 45/00* | (2006.01) |
| *H02K 15/02* | (2006.01) |
| *B21D 28/22* | (2006.01) |

(52) U.S. Cl.
CPC ........ *B30B 15/0041* (2013.01); *B21D 45/003* (2013.01); *B30B 15/14* (2013.01); *B30B 15/26* (2013.01); *H02K 15/022* (2013.01); *B21D 28/22* (2013.01)

(58) Field of Classification Search
CPC . B30B 15/0041; B30B 15/14; B30B 15/0029; B30B 15/0035; B30B 1/186; B21D 45/003; B21D 28/22; Y10T 83/87
USPC ....... 100/43, 48, 50, 257, 282; 72/20.1, 441, 72/446, 20.2; 83/530
See application file for complete search history.

(56) References Cited

U.S. PATENT DOCUMENTS

| | | | | |
|---|---|---|---|---|
| 4,480,538 A | * | 11/1984 | Yoshida | B30B 15/14 100/282 |
| 5,140,834 A | * | 8/1992 | Kashiwagi | B30B 15/0041 100/257 |
| 5,269,163 A | * | 12/1993 | Yagi | B30B 15/0041 100/99 |
| 5,493,959 A | * | 2/1996 | Yagi | B30B 15/0035 100/257 |
| 7,187,996 B2 | * | 3/2007 | Tanaka | B30B 15/0041 100/43 |
| 8,100,052 B2 | * | 1/2012 | Kitazawa | B30B 15/0041 100/35 |

FOREIGN PATENT DOCUMENTS

| | | | |
|---|---|---|---|
| JP | 2-025549 A | 1/1990 | |
| JP | 7-204765 A | 8/1995 | |
| JP | 2005-103551 A | 4/2005 | |
| JP | 2009-274080 A | 11/2009 | |
| JP | EP 2119557 A2 * | 11/2009 | ......... B30B 15/0041 |
| JP | 2010-142852 A | 7/2010 | |

* cited by examiner

*Primary Examiner* — Jimmy T Nguyen

(74) *Attorney, Agent, or Firm* — McDermott Will & Emery LLP

(57) ABSTRACT

A press machine is provided with a bottom dead center position correction control section, a selected lower bottom dead center position setting section, and a bottom dead center position switching section. The bottom dead center position correction control section is configured to perform, based on the selected bottom dead center position after the switching and the detected bottom dead center position, positional correction so that the actual bottom dead center position of the slide is adjusted to the selected bottom dead center position.

5 Claims, 14 Drawing Sheets

BDC: BOTTOM DEAD CENTER

BDC: BOTTOM DEAD CENTER

BDC:BOTTOM DEAD CENTER

BDC: BOTTOM DEAD CENTER

BDC:BOTTOM DEAD CENTER

PRESS MACHINE CONTROLLER

FIELD OF THE INVENTION

The present invention relates to a press machine including an actuator capable of lowering a workpiece support unit from a press working position by a distance corresponding to a predetermined amount or more, and raising the workpiece support unit so as to be returned to the press working position after ejecting a workpiece.

BACKGROUND

Press machines are configured to manufacture a product by press working to be performed in cooperation between an upper die and a lower die while raising and lowering a slide. One important factor to determine the precision of the product is that a bottom dead center position of the slide is maintained to be constant.

In general, the bottom dead center position and a press speed have such a close relationship as illustrated in FIG. 11. In FIG. 11, the horizontal axis represents the number of shots of the press machine, and the vertical axis represents the bottom dead center position of the slide and the press speed. In FIG. 11, the bottom dead center position is as indicated by the slope part during an accelerated press operation, and by the horizontal part during a constant-speed press operation. Specifically, as the press speed increases, a downward inertial force of the slide at the bottom dead center increases, and hence the bottom dead center position of the slide becomes lower along with the increase in press speed. When the press speed is constant, the fluctuation of the bottom dead center position is significantly small.

As described above, it is important to determine whether or not the bottom dead center position is a proper position, and to set a proper bottom dead center position during the press operation.

As a determination device, there is proposed a device that performs the determination based on the number of depressed portions formed by marking (see Japanese Patent Application Laid-open No. 2010-142852). Specifically, the product is marked by punches having different heights, and the bottom dead center position is determined based on the number of marks. The determination result is used for correcting the bottom dead center position in subsequent manual work.

As a bottom dead center position correcting device, most of the devices include a sensor for detecting a die height of the press (for example, a distance from a top surface of a bolster to a bottom surface of the slide), and are configured to automatically correct an actual bottom dead center position of the slide to be adjusted to a target bottom dead center position while constantly controlling drive of a slide adjusting mechanism based on a detection signal from the sensor.

A representative improvement measure for the bottom dead center position correcting device (Japanese Patent Application Laid-open No. 2009-274080) is described. This improved device focuses on characteristics of fluctuation of the bottom dead center position during the accelerated operation and the constant-speed operation, and is configured to reduce a control load while ensuring correction accuracy in both cases. Specifically, when the press speed (SPM) changes, the acceleration of the slide changes in accordance with the SPM (as a result, the bottom dead center position changes), and hence the improved device corrects the bottom dead center position of the slide on a single-cycle basis. When the SPM is stable, on the other hand, the improved device is configured to correct the bottom dead center position of the slide on a multi-cycle basis.

By the way, as a press machine that manufactures a lamination product (completed by punching and laminating thin plates such as magnetic steel sheets), there are known a press machine of a squeeze ring holding type, which is capable of laminating punched thin plates while holding the thin plates by a squeeze ring (Japanese Patent Application Laid-open No. H07-204764), and a press machine of an actuator raising/lowering type, which laminates half-finished lamination products while lowering the half-finished lamination products by an actuator (for example, a hydraulic cylinder) (Japanese Utility Model Examined Publication No. H02-25549).

The press machine of the squeeze ring holding type includes a squeeze ring provided below a punching die, and this squeeze ring has a diameter slightly smaller than a diameter of the die. The press machine is configured to hold a punched thin plate (such as a core piece) while receiving the thin plate by the squeeze ring, and subsequently laminate the thin plate by being crimped with a thin plate that is punched out through use of a punch. In this type of press machine, there is proposed an improvement measure to increase a force for holding the thin plate by arranging magnets around the squeeze ring in preparation for further increase in diameter and thinning of the thin plate (Japanese Patent Application Laid-open No. 2005-103551).

The press machine of the actuator raising/lowering type is configured to punch a thin plate through use of a press, and form crimping projections having depressed portions on a front surface of the thin plate and projecting portions on a back surface thereof (see FIGS. 4 and 5 of the present application). In a laminating die, in a laminating process before the product is completed, a fitting and crimping pressure is applied to the half-finished products. Then, the plurality of half-finished products are laminated to obtain the product (such as a motor core and a transformer). The actuator supports the half-finished products from the bottom in the lower die so as to smoothly carry out the above-mentioned processing steps.

Specifically, the actuator is capable of lowering a workpiece support unit (receiving base 120) to a product ejecting position (see (ii) of FIG. 7), which is located lower than a press working position (see (i) FIG. 7) by a distance corresponding to a predetermined amount or more, and raising the workpiece support unit so as to be returned to the press working position (see (iii) of FIG. 7) after ejecting the product. Please see FIGS. 6 and 7.

More specifically, a lamination core having crimping projections and depressions formed therein in a previous step for each press stroke is finally punched into the laminating die 8. The actuator 100 inside the die 8 generates a receiving force when the lamination core is punched and crimped through use of the punch, and is lowered by an amount corresponding to a plate thickness of the lamination core for each crimping (see (i) of FIG. 7). Further, when ejecting the product (having the lamination cores laminated at a predetermined lamination thickness) from the die, the actuator 100 (hydraulic cylinder) is temporarily depressurized and lowered to the product ejecting position (see (ii) of FIG. 7), and after the product is ejected from the die, the actuator 100 is raised and pressurized again (see (iii) of FIG. 7).

Further, every time a predetermined number of the above-mentioned lamination cores are punched into the die, one of the lamination cores has only the depressed portions formed therein (without the projecting portions). Due to this lamination core, a lamination core that is punched into the die prior to this lamination core is not coupled to a succeeding lamination core that is punched into the die subsequently to this lamination core.

Along with the movement of the actuator, the bottom dead center of the slide of the press machine is also repeatedly lowered and raised (recovered) abruptly in accordance with a clearance inside a suspension for driving the slide and a load on the actuator. When the actuator inside the die is lowered so as to eject, from the die, the lamination cores that are laminated at a predetermined lamination thickness, the receiving force generated by the actuator against the punch when the lamination core is punched and crimped is eliminated, and hence the bottom dead center of the slide is lowered abruptly.

FIG. 12A is an explanatory timing chart illustrating a fluctuation of the bottom dead center position mainly at the time when the press speed increases according to a conventional example (the bottom dead center position of the slide is not corrected). The horizontal axis represents the number of shots of the press machine, and the vertical axis represents the bottom dead center position of the slide and the press speed. The bottom dead center position is lowered along with the increase in press speed. Further, along with the depressurization and the lowering operation of the actuator, the receiving force generated by the actuator against the punch when the lamination core is punched and crimped is eliminated, and hence the bottom dead center position is also lowered abruptly.

FIG. 12B is an explanatory timing chart illustrating a fluctuation of the bottom dead center position mainly at the time when the press speed is stable according to the conventional example (the bottom dead center position of the slide is not corrected). Along with the depressurization and the lowering operation of the actuator or the pressurization and the raising operation thereof, the bottom dead center position of the slide is lowered or raised abruptly in accordance with the clearance inside the drive mechanism for driving the slide and the load on the actuator. The lowering amount changes depending on the presence and absence of a stopper, the clearance inside the press machine, or the amount of the load on the actuator.

Note that, there are many cases where mechanical measures are taken so as to prevent trouble with the precision of the product even when the bottom dead center position is lowered. Specifically, even when the clearance inside the suspension for driving the slide is large and therefore the bottom dead center is lowered significantly, the lowering amount is restricted by a stopper block for the bottom dead center, which is provided in the die.

As described above, in the conventional example, the actuator that causes excessive disturbance on the bottom dead center position of the slide is built into the press machine, and hence the automatic correction of the bottom dead center position is not performed in most cases.

In view of the above, the inventor of the present invention has attempted to introduce the bottom dead center position correcting device into the press machine of the actuator raising/lowering type. The bottom dead center position correcting device built into the press machine is, as described above, configured to perform, based on the target bottom dead center position and a detected bottom dead center position obtained during the press operation, positional correction so that the actual bottom dead center position of the slide is adjusted to the target bottom dead center position.

FIG. 9A illustrates a change of the bottom dead center position in a case where the automatic correction is performed in every cycle shot mainly at the time when the press speed changes. The horizontal axis represents the number of shots, and the vertical axis represents the bottom dead center position of the slide and the press speed. In FIG. 9A, the region lower than the position of "0" indicates a direction in which the bottom dead center position is lowered, and the region higher than the position of "0" indicates a direction in which the bottom dead center position is raised. Further, FIG. 9B illustrates a change of the bottom dead center position in a case where the automatic correction is performed in every cycle shot at the time when the press speed is constant.

Specifically, when the actuator is depressurized and lowered or pressurized and raised during the correction control for the bottom dead center position, an abrupt and excessive change occurs in the bottom dead center position of the slide. Even when the bottom dead center is monitored in every shot, due to the feedback control, it is impossible to prevent the abrupt and excessive change of the bottom dead center position that is caused by the disturbance such as the raising and lowering operation of the actuator. This is because the bottom dead center position correcting device executes the correction in a subsequent stroke from the fact that the actual bottom dead center position deviating from the target bottom dead center position is present. In other words, irrespective of whether the press operation is performed at changing speed or constant speed, the bottom dead center position that is abruptly changed due to the disturbance inevitably results in the actual bottom dead center position deviating from the target bottom dead center position. As illustrated in FIGS. 9A and 9B, there occur abrupt and excessive fluctuations Dyu and Dyd of the bottom dead center position corresponding to a delay in response.

Next, in a case where the bottom dead center position is corrected through averaging performed on a multi-cycle basis (FIG. 10), an average value of a plurality of arbitrary shots including current and previous shots serves as a correction value, and hence the delay occurs. The operation is brought into an oscillatory state due to the abrupt and excessive change of the bottom dead center position that occurs unexpectedly. The oscillation occurs in addition to the delay. That is, the operation is brought into an uncontrollable state, which increases a risk in that the bottom dead center position fluctuates in a severely undulating manner.

By the way, in the case of the lowering of the bottom dead center position due to the lowering operation of the actuator ("Dyd" of FIGS. 9A and 9B), the lowering amount may be restricted by introducing the auxiliary mechanical stopper block as described above, and hence there may arise no particular problem in the manufacture of the product. On the other hand, it is in some cases preferred to avoid suspending the correction of the bottom dead center position under a state in which the stopper block is not introduced.

Even during the correction control for the bottom dead center position, however, the actual bottom dead center position is raised in an abrupt and excessive manner ("Dyu" of FIGS. 9A and 9B) due to the raising operation of the actuator. Then, in the step (the crimping projections and depressions are formed) prior to the step in which the lamination core is punched into the die, the depth of the crimping projections and depressions becomes smaller than originally intended. As a result, the fitting and crimping pressure decreases, and hence the crimping is insufficient, which causes such an adverse effect that the thin plates are separated from each other. This adverse effect is caused from the fact that, in the case of the raising operation, the mechanical restricting unit such as the stopper block cannot be provided unlike the case of the lowering operation.

Further, when the bottom dead center position fluctuates significantly toward the lower side due to the oscillation (FIG. 10), the depth of the projections and depressions becomes larger than originally intended, and hence the projecting portions are disengaged due to crimping failure. In addition, when the stopper block is provided in the die, the amount of abutment of the slide against the stopper block increases considerably, and hence the slide bounces significantly. As a result, the precision of the product is deteriorated and the life of the die is reduced. Eventually, the risk of an overload on the press machine increases.

As described above, in the conventional press machine, a considerable amount of raising and lowering shift of the actuator is added as the disturbance, and hence, to avoid the adverse effect induced by this disturbance, the bottom dead center position correcting device has not presumably been introduced in most cases. Further, even in the bottom dead center position correcting device (Japanese Patent Application Laid-open No. 2009-274080), the abrupt and excessive change of the bottom dead center of the slide has not been taken into consideration.

SUMMARY OF THE INVENTION

It is an object of the present invention to provide a press machine capable of manufacturing a high-quality product while preventing an abrupt and excessive rise of an actual bottom dead center position that occurs along with a raising operation of an actuator.

According to a first embodiment of the invention, there is provided a press machine including an actuator capable of lowering a workpiece support unit from a press working position by a distance corresponding to a predetermined amount or more, and raising the workpiece support unit so as to be returned to the press working position after ejecting a workpiece, the press machine including:

a bottom dead center position correction control section, which performs, based on a preset target bottom dead center position and a detected bottom dead center position obtained during a press operation, positional correction so that an actual bottom dead center position of a slide is adjusted to the preset target bottom dead center position;

a selected bottom dead center position setting section, which sets a selected bottom dead center position selected as a position lower than the preset target bottom dead center position; and a bottom dead center position switching section, which switches the preset target bottom dead center position to the selected bottom dead center position in association with a raising and lowering operation association signal of the actuator, in which the bottom dead center position correction control section is configured to perform, based on the selected bottom dead center position after the switching and the detected bottom dead center position, positional correction so that the actual bottom dead center position of the slide is adjusted to the selected bottom dead center position.

According to the first embodiment of the invention, it is possible to prevent the abrupt and excessive rise of the actual bottom dead center position that occurs along with the lowering and raising operations of the actuator. That is, it is possible to manufacture a high-quality product.

Further, according to a second embodiment of the invention, there is provided a press machine including an actuator capable of lowering a workpiece support unit from a press working position by a distance corresponding to a predetermined amount or more, and raising the workpiece support unit so as to be returned to the press working position after ejecting a workpiece, the press machine including:

a bottom dead center position correction control section, which performs, based on a preset target bottom dead center position and a detected bottom dead center position obtained during a press operation, positional correction so that an actual bottom dead center position of a slide is adjusted to the preset target bottom dead center position;

a selected lower bottom dead center position setting section, which sets a selected lower bottom dead center position selected as a position lower than the preset target bottom dead center position;

a selected higher bottom dead center position setting section, which sets a selected higher bottom dead center position selected as a position higher than the selected lower bottom dead center position;

a lowering-operation bottom dead center position switching section, which switches the preset target bottom dead center position to the selected lower bottom dead center position when a lowering operation association signal of the actuator is input; and a raising-operation bottom dead center position switching section, which switches the preset target bottom dead center position to the selected higher bottom dead center position when a raising operation association signal of the actuator is input, in which the bottom dead center position correction control section is configured to:
  under a state in which the workpiece support unit is lowered from the press working position by the distance corresponding to the predetermined amount or more, based on the selected lower bottom dead center position in place of the preset target bottom dead center position and on the detected bottom dead center position, perform positional correction so that the actual bottom dead center position of the slide is adjusted to the selected lower bottom dead center position; and
  under a state in which the workpiece support unit is raised so as to be returned to the press working position, based on the selected higher bottom dead center position in place of the preset target bottom dead center position and on the detected bottom dead center position, perform positional correction so that the actual bottom dead center position of the slide is adjusted to the selected higher bottom dead center position.

According to the second embodiment of the invention, it is possible to prevent the abrupt and excessive rise of the actual bottom dead center position that occurs along with the raising operation of the actuator. That is, the depth of the crimping projections and depressions may be maintained as originally intended, and hence the crimping may be performed sufficiently. In other words, a high-quality product may be manufactured. Further, the correction control is continued also when the actuator is lowered, and hence the bottom dead center position may be maintained stably even without a stopper block.

Further, according to a third embodiment of the invention, there is provided a press machine including an actuator capable of lowering a workpiece support unit from a press working position by a distance corresponding to a predetermined amount or more, and raising the workpiece support unit so as to be returned to the press working position after ejecting a workpiece, the press machine including:

a bottom dead center position correction control section, which performs, based on a preset target bottom dead center position and a detected bottom dead center position obtained during a press operation, positional correction so that an actual bottom dead center position of a slide is adjusted to the preset target bottom dead center position;

a selected lower bottom dead center position setting section, which sets a selected lower bottom dead center position selected as a position lower than the preset target bottom dead center position;

a selected higher bottom dead center position setting section, which sets a selected higher bottom dead center position selected as a position higher than the selected lower bottom dead center position;

a lowering-operation bottom dead center position switching section, which switches the preset target bottom dead center position to the selected lower bottom dead center position when a lowering operation association signal of the actuator is input; and a raising-operation bottom dead center position switching section, which switches the preset target bottom dead center position to the selected higher bottom dead center position when a raising operation association signal of the actuator is input, in which the bottom dead center position correction control section is configured to:

when a difference between lowering-operation actually measured bottom dead center positions in two sequential strokes of the slide is equal to or larger than a lowering-operation preset bottom dead center position fluctuation amount, based on the selected lower bottom dead center position in place of the preset target bottom dead center position and on the detected bottom dead center position, perform positional correction so that the actual bottom dead center position of the slide is adjusted to the selected lower bottom dead center position; and when a difference between raising-operation actually measured bottom dead center positions in two sequential strokes of the slide is equal to or larger than a raising-operation preset bottom dead center position fluctuation amount, based on the selected higher bottom dead center position in place of the preset target bottom dead center position and on the detected bottom dead center position, perform positional correction so that the actual bottom dead center position of the slide is adjusted to the selected higher bottom dead center position.

According to the third embodiment of the invention, the effects similar to those in the second embodiment of the invention may be produced. Further, as compared to the second embodiment of the invention, the bottom dead center position correction control section may function while grasping the change of the bottom dead center position that is caused by the lowering and raising operations of the actuator, and thus a higher control response speed may be obtained, with the result that a higher-quality product may be manufactured.

Further, in the second or third embodiment of the invention, under a condition that the lowering operation association signal of the actuator has been input and the difference between the lowering-operation actually measured bottom dead center positions in the two sequential strokes of the slide has become equal to or larger than the lowering-operation preset bottom dead center position fluctuation amount, the selected higher bottom dead center position setting section may be capable of automatically setting one of the lowering-operation actually measured bottom dead center positions, which is obtained previously, as the selected higher bottom dead center position.

With this configuration, the effects similar to those in the second or third embodiment of the invention may be produced. Further, as compared to the above-mentioned respective embodiments of the invention, the actually measured bottom dead center position on the higher-side, which is obtained for the first time when the actuator is lowered, may automatically be set as the selected higher bottom dead center position, and hence the bottom dead center position at the time of the raising operation of the actuator may be corrected to be an optimum bottom dead center position that is suited to characteristics of the press machine and a manner of the press operation.

Further, in the second or third embodiment of the invention, under a condition that the lowering operation association signal of the actuator has been input and the difference between the lowering-operation actually measured bottom dead center positions in the two sequential strokes of the slide has become equal to or larger than the lowering-operation preset bottom dead center position fluctuation amount, the selected lower bottom dead center position setting section may be capable of automatically setting one of the lowering-operation actually measured bottom dead center positions, which is obtained subsequently, as the selected lower bottom dead center position.

With this configuration, the effects similar to those in the second or third embodiment of the invention may be produced. Further, as compared to the above-mentioned respective embodiments of the invention, the actually measured bottom dead center position on the lower-side, which is obtained subsequently when the actuator is lowered, may automatically be set as the selected lower bottom dead center position, and hence the bottom dead center position at the time of the lowering operation of the actuator may be corrected to be an optimum bottom dead center position that is suited to characteristics of the press machine and a manner of the press operation.

Further, in the second or third embodiment of the invention, the selected higher bottom dead center position may be a position lower than the preset target bottom dead center position.

With this configuration, the effects similar to those in the second or third embodiment of the invention may be produced. Further, as compared to the above-mentioned respective embodiments of the invention, the bottom dead center position at the time of the raising operation of the actuator may be corrected to be a bottom dead center position that is lower than the target bottom dead center position and suited to the manner of the press operation.

DETAILED DESCRIPTION OF THE PREFERRED EMBODIMENTS

Figure 1:
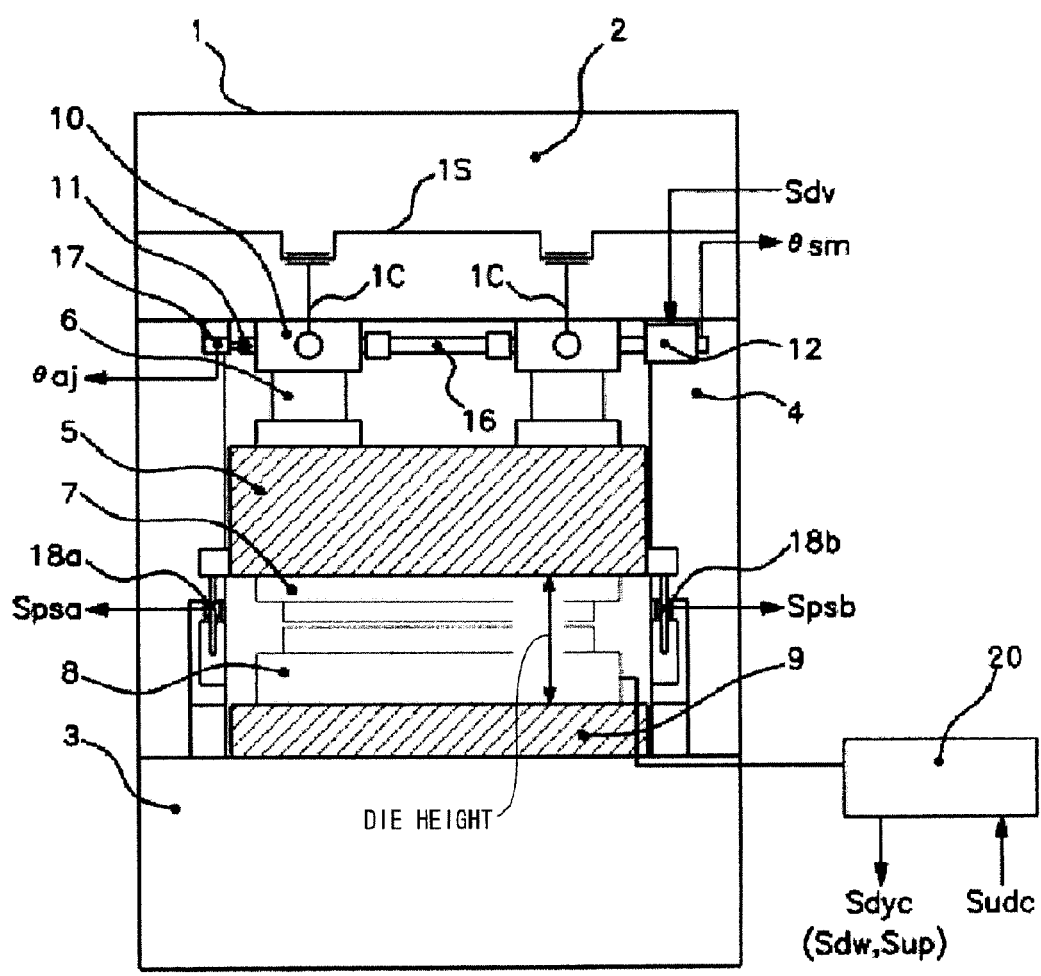
FIG. 1 is an explanatory schematic front view illustrating a press machine according to an embodiment of the present invention.

In the following, an exemplary embodiment of the present invention is described in detail with reference to the accompanying drawings (FIGS. 1 to 6).

The present invention provides a press machine, including: a bottom dead center position correction control section (31, 33, 34), which performs, based on a preset target bottom dead center position Hx and a detected bottom dead center position (Spsa, Spsb) obtained during a press operation, positional correction so that an actual bottom dead center position of a slide 5 is adjusted to the target bottom dead center position Hx; a selected bottom dead center position setting section (35 and 31, 33, 34), which sets a selected bottom dead center position; and a bottom dead center position switching section (31, 33, 34), which switches the target bottom dead center position to the selected bottom dead center position. The bottom dead center position correction control section (31, 33, 34) is configured to perform, based on the selected bottom dead center position after the switching and the detected bottom dead center position, positional correction so that the actual bottom dead center position of the slide 5 is adjusted to the selected bottom dead center position.

Note that, a workpiece herein refers to any one of a material (thin plate) before press working, a half-finished product subjected to the press working, and a product completed through lamination. Further, for convenience of the description, the bottom dead center position correction control section (31, 33, 34) that functions when a manual operation mode is selected at the time of executing the correction of the bottom dead center position may sometimes be referred to as "first bottom dead center position correction control section", the bottom dead center position correction control section (31, 33, 39) that functions when a second automatic operation mode is selected may sometimes be referred to as "second bottom dead center position correction control section", and the bottom dead center position correction control section (31, 33, 39) that functions when a first automatic operation mode is selected may sometimes be referred to as "third bottom dead center position correction control section".

The selected bottom dead center position setting section (35 and 31, 33, 34) is capable of setting the selected bottom dead center position (for example, a selected higher bottom dead center position) selected (or serving) as a position lower than the target bottom dead center position Hx. The bottom dead center position switching section (31, 33, 34) is capable of switching the target bottom dead center position to the selected bottom dead center position in association with a raising and lowering operation association signal Sdyc (for example, a raising operation association signal a raising operation start command signal Sup) of an actuator. Under a state in which a workpiece support unit is returned to a press working position, the first bottom dead center position correction control section (31, 33, 34) is configured to perform, based on the selected bottom dead center position after the switching (for example, the selected higher bottom dead center position) and the detected bottom dead center position, the positional correction so that the actual bottom dead center position is adjusted to the selected bottom dead center position.

Further, when the workpiece support unit is lowered in a direction of a product ejecting position, the press machine is configured to restrict the bottom dead center position through use of a stopper block. Thus, it is possible to prevent an abrupt and excessive rise of the actual bottom dead center position that occurs along with a raising operation performed again after the lowering operation of the actuator.

In this embodiment, in order to achieve a higher selectivity of a wide variety of functions and a simpler operation, the press machine is capable of selectively executing optimum correction of the bottom dead center position that is suited to characteristics of the press machine and a manner of the press operation.

Specifically, the selected bottom dead center position setting section is capable of setting a selected higher bottom dead center position and a selected lower bottom dead center position, and selecting a manual setting and an automatic setting. Further, the bottom dead center position switching section is capable of switching the target bottom dead center position in accordance with an operation status of the actuator (raising and lowering operation association signal Sdyc), and also capable of selecting a condition to start the correction control by the bottom dead center position correction control section. Still further, the selected higher bottom dead center position and the selected lower bottom dead center position may be measured automatically in accordance with the operation status of the actuator (raising and lowering operation association signal Sdyc), and a selected higher bottom dead center position setting section and a selected lower bottom dead center position setting section are capable of automatically setting the actually measured values of the selected higher bottom dead center position and the selected lower bottom dead center position, respectively.

By the way, a press machine 1 illustrated in FIG. 1 includes the actuator capable of lowering the workpiece support unit from the press working position on the upper side by a distance corresponding to a predetermined amount or more, and raising the workpiece support unit so as to be returned to the original press working position after ejecting the product.

Figure 6:
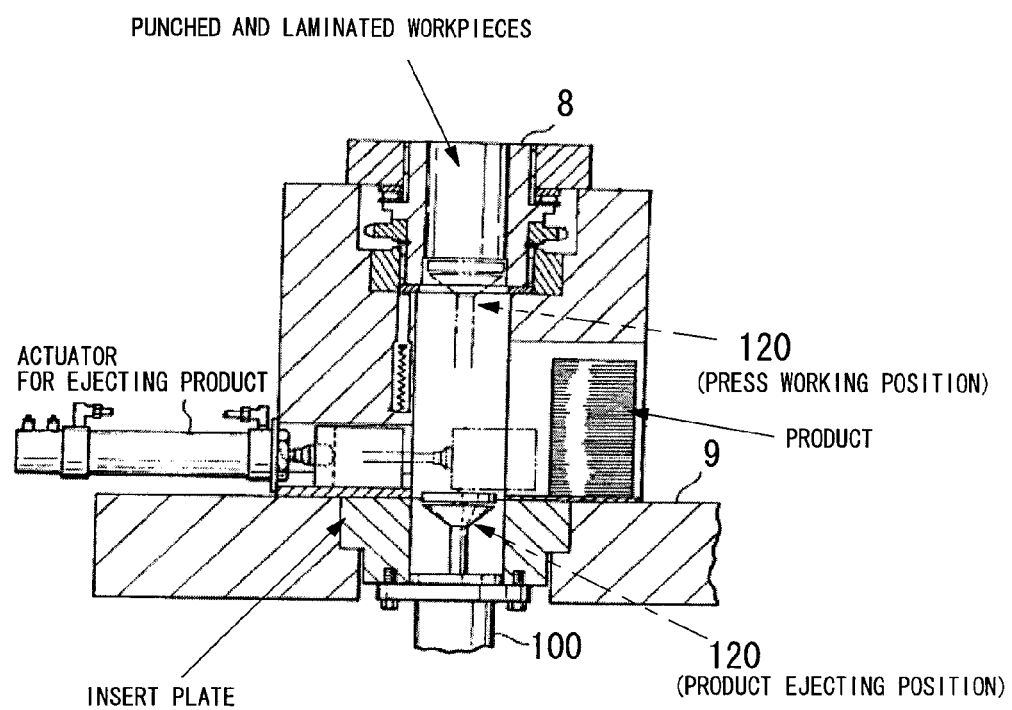
FIGS. 6 and 7 are explanatory sectional partially schematic side views illustrating a workpiece support unit (receiving base 120) provided in the press machine.
Figure 7:
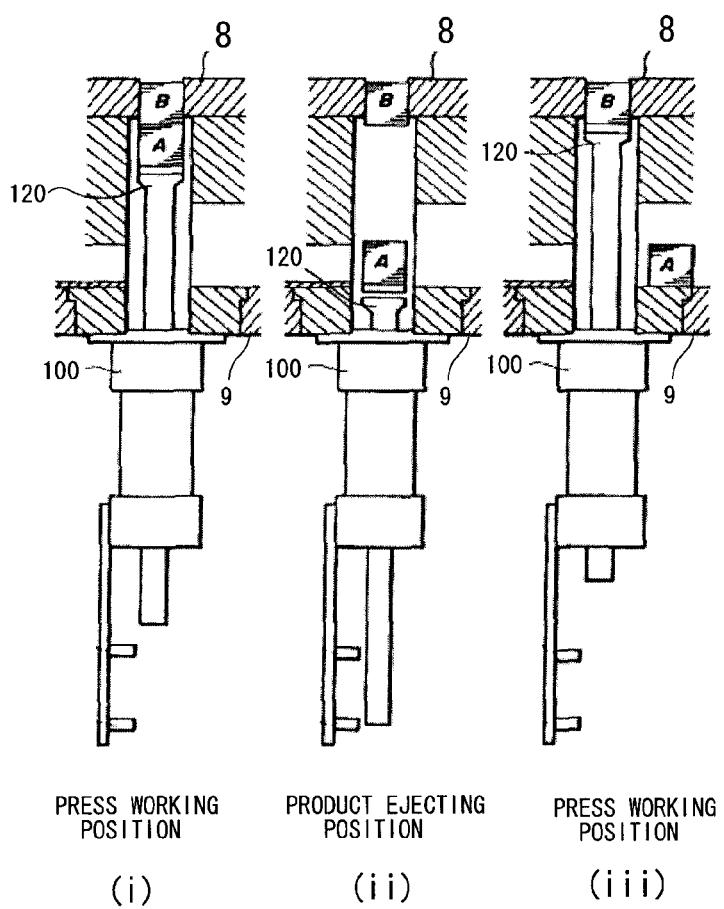

The workpiece support unit is corresponding to the receiving base 120 as shown in FIGS. 6 and 7. The actuator 100 corresponds to the hydraulic cylinder 100, and is firmly fixed to the bottom surface of the insert plate of the press bolster 9. The receiving base 120 and the actuator 100 respectively may have the same structure as the receiving base (12) and the actuator (10) described in Japanese Utility Model Examined Publication No. H02-25549.

Figure 4:
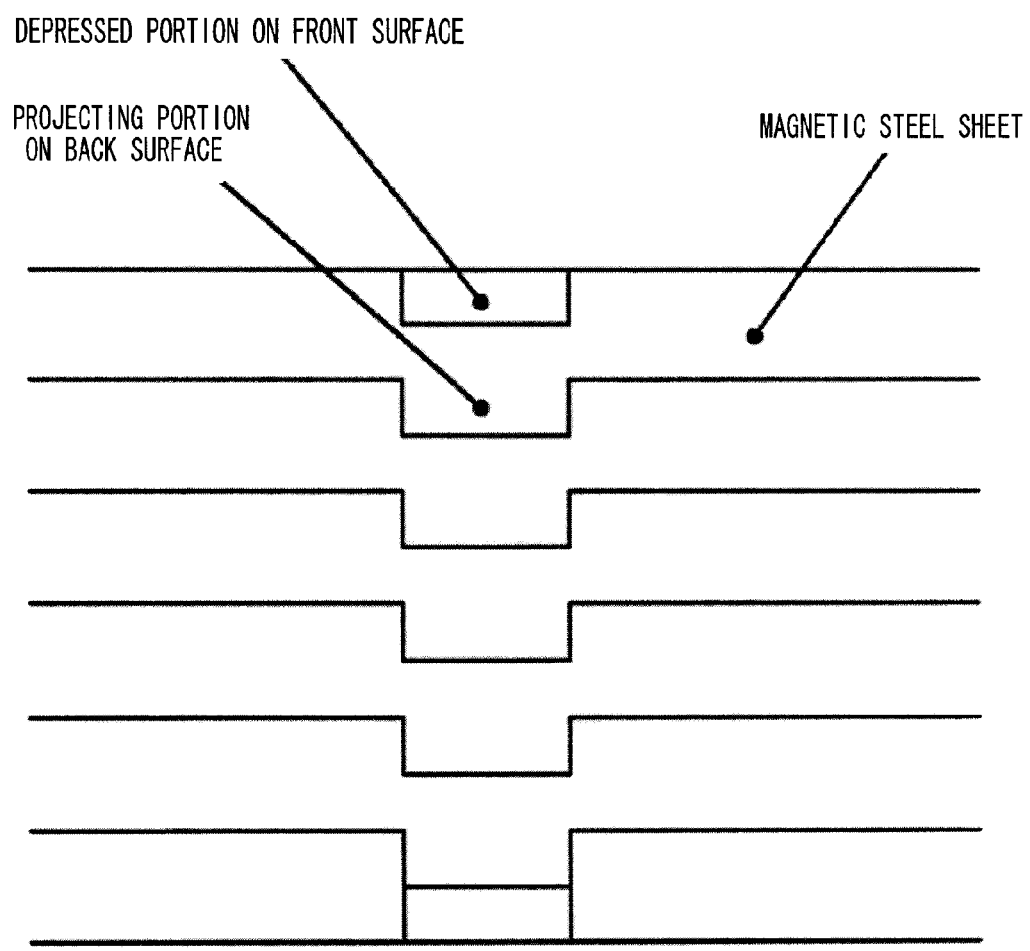
FIG. 4 is an explanatory view illustrating projections in a crimping portion.
Figure 5:
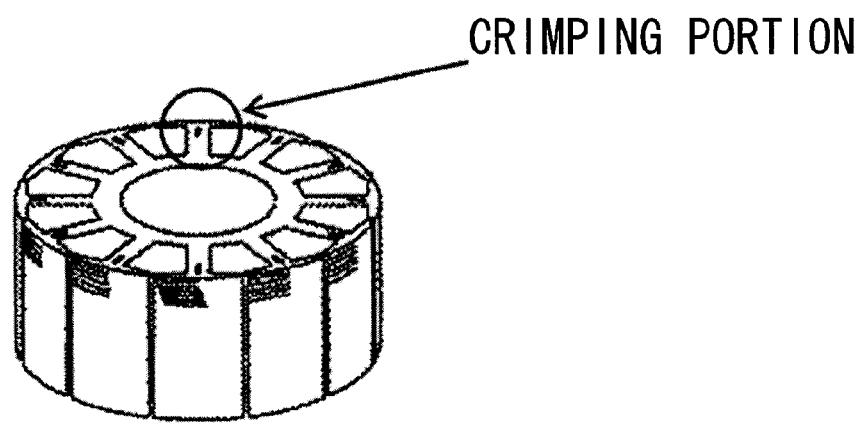
FIG. 5 is an explanatory view illustrating an outer appearance of a workpiece (lamination motor core) subjected to press working.

The press machine 1 is configured to punch a thin plate through use of a press, and form crimping projections having depressed portions on a front surface of the thin plate and projecting portions on a back surface thereof (see FIGS. 4 and 5 of the present application). In a laminating die, in a laminating process before the product is completed, a fitting and crimping pressure is applied to the half-finished products. Then, the plurality of half-finished products are laminated to obtain the product (such as a motor core and a transformer). The actuator supports the half-finished products from the bottom in the lower die so as to smoothly carry out the above-mentioned processing steps.

Specifically, the actuator 100 is capable of lowering a workpiece support unit 120 (receiving base 120) to a product ejecting position (see (ii) of FIG. 7), which is located lower than a press working position (see (i) of FIG. 7) by a distance corresponding to a predetermined amount or more, and raising the workpiece support unit 120 so as to be returned to the press working position (see (iii) of FIG. 7) after ejecting the product. Please see FIGS. 6 and 7.

More specifically, a lamination core having crimping projections and depressions formed therein in a previous step for each press stroke is finally punched into the laminating die 8. The actuator 100 inside the die 8 generates a receiving force when the lamination core is punched and crimped through use of the punch, and is lowered by an amount corresponding to a plate thickness of the lamination core for each crimping (see (i) of FIG. 7). Further, when ejecting the product (having the lamination cores laminated at a predetermined lamination thickness) from the die, the actuator 100 (hydraulic cylinder) is temporarily depressurized and lowered to the product ejecting position (see (ii) of FIG. 7), and after the product is ejected from the die, the actuator 100 is raised and pressurized again (see (iii) of FIG. 7).

Incidentally, while the product (having the lamination cores laminated at a predetermined lamination thickness) is ejected from the die, press work (punching work) for punching the workpiece by the press machine 1 is continuously performed. That is, in (ii) of FIG. 7, press working operation (punching work) for punching the workpiece by the press machine 1 is continuously performed. At this time, circumferential surfaces of the punched workpieces are supported by a hole of the die 8, as shown in (ii) of FIG. 7.

Further, every time a predetermined number of the above-mentioned lamination cores are punched into the die, one of the lamination cores has only the depressed portions formed therein (without the projecting portions). Due to this lamination core, a lamination core that is punched into the die prior to this lamination core is not coupled to a succeeding lamination core that is punched into the die subsequently to this lamination core.

Along with the movement of the actuator 100, the bottom dead center of the slide 5 of the press machine 1 is also repeatedly lowered and raised (recovered) abruptly in accordance with a clearance inside a suspension for driving the slide 5 and a load on the actuator 100. When the actuator 100 inside the die 8 is lowered so as to eject, from the die, the lamination cores that are laminated at a predetermined lamination thickness, the receiving force generated by the actuator 100 against the punch when the lamination core is punched and crimped is eliminated, and hence the bottom dead center of the slide 5 is lowered abruptly.

Herein, concerning "press working position" and "distance corresponding to the predetermined amount or more" as described in the present invention, "press working position" denotes a position where the work supporting unit 120 supports the stacked workpieces, in order to laminate the workpieces punched in the die 8. And "distance corresponding to the predetermined amount or more" refers to such a distance that the reaction force applied thus far is eliminated during the lowering operation of the slide 5 and the bottom dead center position of the slide 5 therefore fluctuates significantly. This distance is a large distance that cannot be generated during the press working operation of the press machine without the actuator. In other words, in the press machine having the conventional bottom dead center position correcting device built therein, this distance is a large distance that causes an excessive delay in control time, an oscillation in the control, or a trouble in the control.

In FIG. 1, a main body of the press machine 1 is constructed of a crown 2 on an upper side, a bed 3 on a lower side, and columns 4 arranged at four corners in plan view, for coupling the crown 2 and the bed 3 integrally to each other. The slide 5 guided along the columns 4 so as to be movable in a vertical direction is moved in the vertical direction (raised and lowered) by a slide drive mechanism 6. One vertical movement of the slide 5 is referred to as "one stroke". An upper die 7 is mounted onto the slide 5, and a lower die 8 is mounted onto a bolster 9 that is provided on the bed 3. A distance between relative vertical positions of the upper die 7 and the lower die 8 at the bottom dead center of the slide 5, that is, a distance between a bottom surface of the slide 5 and a top surface of the bolster 9 is referred to as "die height". Maintaining a constant die height is an essential condition to keep the precision (quality) of the press product. That is, the height of the top surface of the bolster 9 is constant, and hence, for the manufacture of a high-quality product, it is essential to maintain a constant bottom dead center position of the slide 5.

A crank mechanism (including a crankshaft 1S and connecting rods 1C) is arranged inside the crown 2. The crankshaft 1S is rotated by a main motor (not shown) through an intermediation of a clutch. A reduction gear mechanism may be interposed in some cases. Further, the slide drive mechanism 6 and the slide 5 are driven to be raised and lowered by the connecting rods 1C rotatably suspended from the crankshaft 1S. The raising and lowering operation of the slide 5 ranges from a top dead center position of the crank mechanism to a bottom dead center position thereof.

A crankshaft encoder (not shown) that detects a rotational angle of the crankshaft 1S is provided on a shaft portion at the other end of the crankshaft 1S. The rotational angle detected by the crankshaft encoder is subjected to signal processing, and thus a press speed (SPM; Storokes Per Minutes) and a current vertical position of the slide 5 (such as the bottom dead center position) may be detected.

Note that, the press machine 1 is not particularly limited in its structure and configuration. Further, the slide drive mechanism is not limited to the crank mechanism according to this embodiment, and similarly to this embodiment, the present invention may be carried out also in a case of other such structures and configurations that the fluctuation amount (protrusion amount) of the bottom dead center position of the slide 5 tends to increase as the press speed increases (for example, an eccentric drive mechanism, a link drive mechanism, or a screw drive mechanism).

A slide position adjusting mechanism 10 includes a worm shaft 11 and structural portions (including a worm wheel (not shown) and an adjustment screw (not shown)) arranged on a bottom surface of the crown 2, and is capable of adjusting a relative vertical position of the slide 5 (that is, a bottom surface position of the slide 5) by rotating the worm shaft 11 and a slide adjustment coupling shaft 16 through drive of a slide adjusting motor 12. Also during the vertical movement of the slide 5 by the crank mechanism (1S, 1C), the position of the slide 5 may be adjusted to be raised and lowered by the slide position adjusting mechanism 10.

Figure 2:
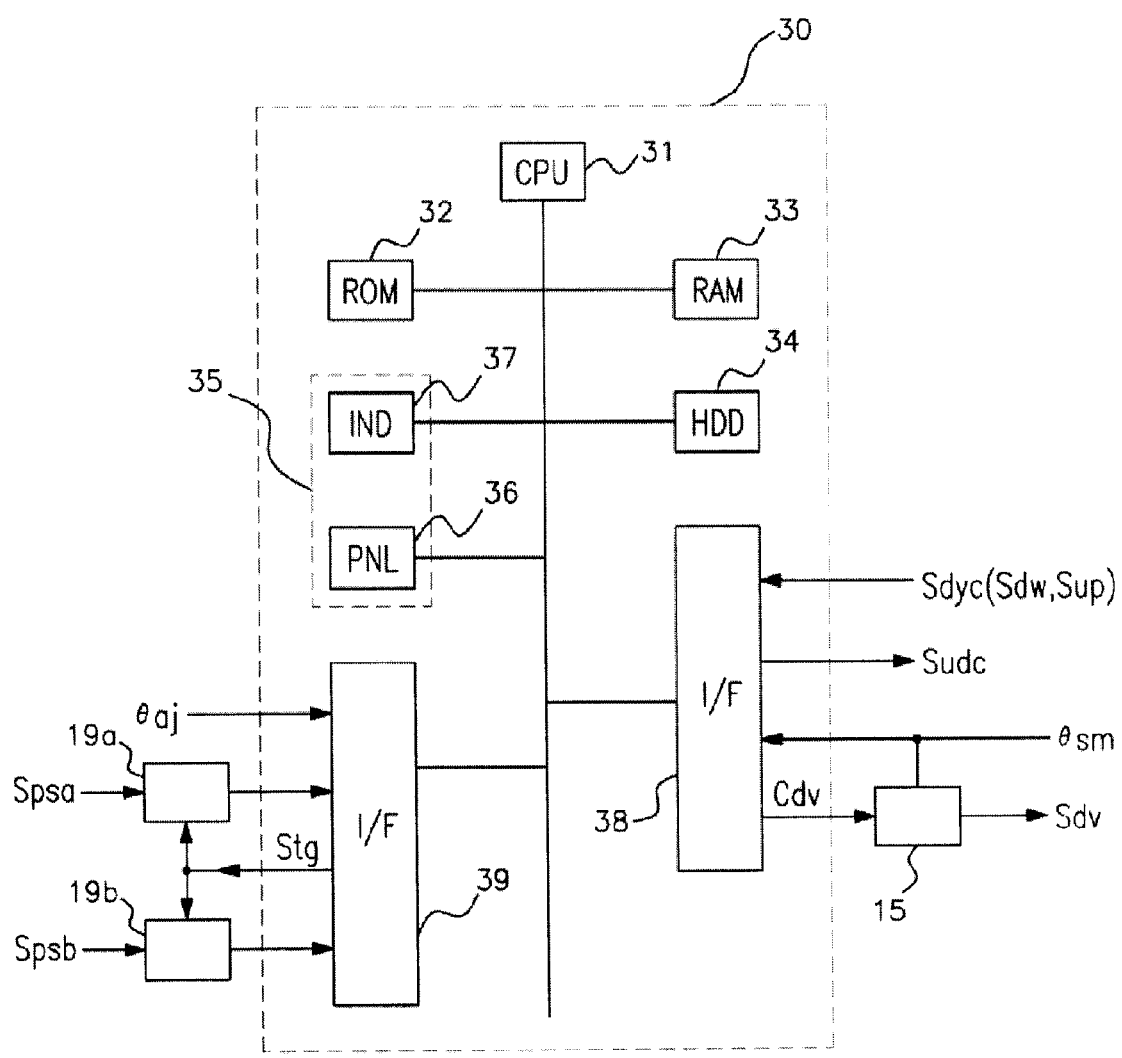
FIG. 2 is an explanatory block diagram illustrating a press operation control device.

The slide adjusting motor 12 is a servomotor, and a rotation direction, a rotation amount, and torque thereof are controlled based on a drive control signal Sdv output from a position control unit 15 illustrated in FIG. 2. A servo amplifier is omitted from the drawings. The drive control signal Sdv is generated and output as a signal corresponding to a deviation signal obtained based on a position indicated by a control target bottom dead center position signal Cdv, which corresponds to a press motion set through use of a touch panel 35 and determined by a press operation control section (31, 33, 34), and a position indicated by a bottom dead center position signal (feedback value) θaj, which is detected by a slide adjustment encoder 17. The control target bottom dead center position signal Cdv is input via an interface 38.

The bottom dead center position of the slide 5 is detected (measured) by position sensors 18a and 18b of FIG. 1, which are capable of detecting a relative positional relationship between the slide (bottom surface) 5 and the bolster 9, and by bottom dead center detection sensor amplifiers 19a and 19b of FIG. 2, which read slide position signals Spsa and Spsb obtained through the detection. The detection timing is determined based on a timing signal Stg, which is generated and output through predetermined processing on a crank angle signal obtained through the detection by the above-mentioned crankshaft encoder. The detected bottom dead center position can be handled as an average value of the detected bottom dead center positions on the right and left.

The press machine 1 is configured to punch a thin plate illustrated in FIG. 4 through use of a press, and form crimping projections having depressed portions on a front surface of the thin plate and projecting portions on a back surface thereof. In a laminating die, in a laminating process before the product is completed, a fitting and crimping pressure is applied to the half-finished products (workpieces). Then, the plurality of half-finished products are laminated while supporting the half-finished products from the bottom in the lower die in cooperation of the actuator. In this manner, a product illustrated in FIG. 5 (motor core, transformer, and the like) is manufactured.

Other mechanical and structural combinations of the press machine 1 and the actuator and basic functional aspects thereof are implemented similarly to the case of Japanese Utility Model Examined Publication No. H02-25549 (FIGS. 3 and 4) described above, and further description thereof is therefore omitted herein. Note that, the present invention may be carried out also in a case where modifications are made in association with the structural or functional aspects.

A die control device 20 is configured to generate various signals for controlling the dies (actuator pressurization and depressurization signal, lamination signal, lamination count signal, punch control signal, and the like). FIGS. 1 and 2 illustrate the die operation status signal Sdyc (lowering operation association signal Sdw and raising operation association signal Sup), which is input to a press operation control device 30 via the interface 38 and is necessary for correction control for the bottom dead center position, and a die control command signal Sudc, which is input from the press operation control device 30 to the die control device 20.

The lowering operation association signal Sdw is selected from among a lowering operation start command signal, a lowering operation start signal, a lowering operation near-completion signal, a lowering operation completion signal, and the like of the actuator (workpiece support base) depending on intended use, and the selected signal may be changed. The raising operation association signal Sup is selected from among a raising operation start command signal, a raising operation start signal, a raising operation near-completion signal, a raising operation completion signal, and the like of the actuator (workpiece support base) depending on intended use, and the selected signal may be changed.

In FIG. 2, the press operation control device 30 includes the CPU 31, a ROM 32, the RAM 33, the HDD 34, the touch panel 35, and the interfaces 38 and 39. The ROM 32 stores an OS, a basic control program, and fixed values. The HDD 34 stores and holds various control programs for carrying out the present invention. The HDD 34 also stores and holds data that is set through input, data obtained through detection, and other data. Note that, the HDD 34 used herein is an example of a nonvolatile memory, and hence a different kind of nonvolatile memory may be used in place of the HDD 34. For convenience of the description, it is assumed that the touch panel 35 includes an operation unit 36 and a display unit 37.

The bottom dead center position correction control section (31, 33, 34) is implemented by the HDD 34 that stores a bottom dead center position correction control program, and by the CPU 31 that executes the bottom dead center position correction control program loaded onto the RAM 33. The bottom dead center position correction control section (31, 33, 34) is configured to execute, based on the preset target bottom dead center position Hx and the detected bottom dead center position obtained during the press operation, the positional correction so that the actual bottom dead center position of the slide 5 is adjusted to the target bottom dead center position. When a press motion is set through use of the touch panel 35, or when a preset and prestored press motion is selected and designated, the target bottom dead center position Hx corresponding to the press motion is determined.

In this description, for example, a "bottom dead center position correction control section (31, 33, 34)" refers to a functional element that is implemented by a CPU 31, a RAM 33, and a HDD 34 of FIG. 2.

The selected bottom dead center position setting section is configured to set the selected bottom dead center position selected as the position lower than the target bottom dead center position Hx. In this embodiment, the selected bottom dead center position setting section includes the selected lower bottom dead center position setting section and the selected higher bottom dead center position setting section, and further, two types of systems, specifically, a manual setting mode and an automatic setting mode are provided to the selected lower bottom dead center position setting section and the selected higher bottom dead center position setting section. Further, in the actual operation, the setting mode is switchable by operating the touch panel 35 (operation unit 36). This is for the purpose of executing optimum correction control for the bottom dead center position that is suited to the characteristics of the press machine 1, the manner of the operation, and the like.

Note that, the selected bottom dead center position setting section may be implemented by a single setting section configured to set the selected bottom dead center position (corresponding to, for example, a higher bottom dead center position). This is because, when the correction control is performed with this selected bottom dead center position (corresponding to the higher bottom dead center position) set as the target value, the abrupt and excessive fluctuation of the bottom dead center position at the time of the raising operation of the actuator may be prevented.

The selected lower bottom dead center position setting section used in the manual setting mode is implemented by the touch panel 35, and is capable of setting the selected lower bottom dead center position (position lower than the target bottom dead center position) while confirming, on the display unit 37, the data input through use of the operation unit 36. The set lower bottom dead center position is stored and held in a set bottom dead center position storage area of the HDD 34. Similarly, the selected higher bottom dead center position setting section used in the manual setting mode is implemented by the touch panel 35, and is capable of setting the selected higher bottom dead center position (position higher than the selected lower bottom dead center position) while confirming, on the display unit 37, the data input through use of the operation unit 36. The set higher bottom dead center position is stored and held in the set bottom dead center position storage area of the HDD 34.

Note that, the selected higher bottom dead center position may be set as a position lower than the target bottom dead center position Hx. This is because the selected higher bottom dead center position is mostly closer to the actual bottom dead center position at the time of the actual press operation of the press machine 1.

Figure 3:
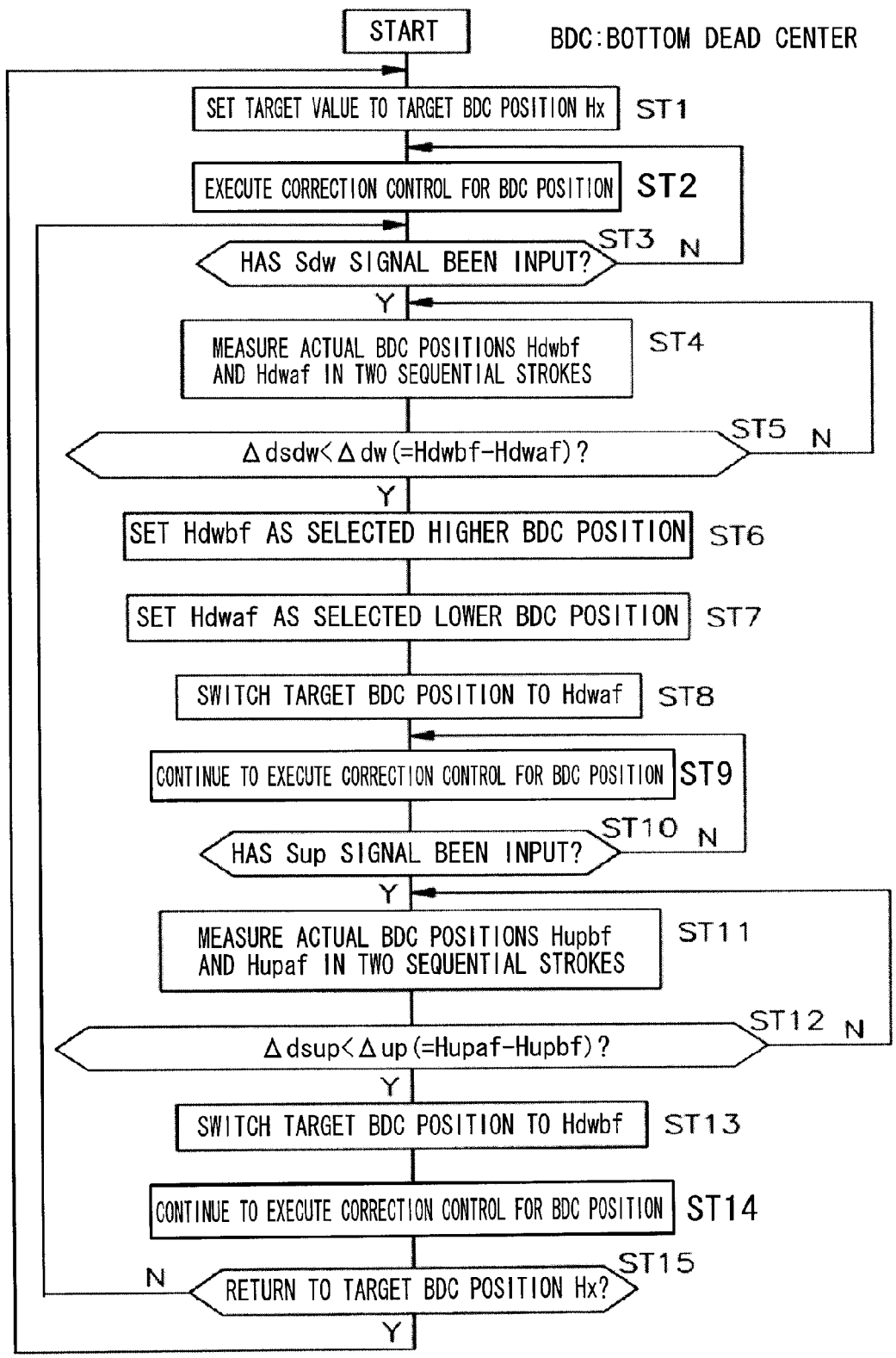
FIG. 3 is an explanatory flow chart illustrating an operation of correction control for a bottom dead center position.

Referring to FIG. 3, under a condition that the lowering operation association signal (for example, the lowering operation start command signal) Sdw of the actuator has been input (YES (Y) in Step 3 (ST3)) and a difference between lowering-operation actually measured bottom dead center positions Hdwbf and Hdwaf in two sequential strokes of the slide 5 (the difference is expressed by $\Delta dw(=Hdwbf-Hdwaf)$) has become equal to or larger than a lowering-operation preset bottom dead center position fluctuation amount ($\Delta dsdw$) (YES in ST5), the selected higher bottom dead center position setting section (31, 33, 34) used in the automatic setting mode is configured to automatically set the lowering-operation actually measured bottom dead center position Hdwbf, which is obtained previously, as the selected higher bottom dead center position (ST6).

The lowering-operation bottom dead center position fluctuation amount ($\Delta dsdw$) is set in advance through use of the lowering-operation bottom dead center position fluctuation amount setting section 35, and is stored and held in an allowable fluctuation amount storage area of the HDD 34. Under a condition that the lowering operation association signal (lowering operation start command signal) Sdw has been input (YES in ST3), the actually measured bottom dead center positions Hdwbf and Hdwaf are obtained by a first sequential bottom dead center position measuring section (31, 33, 34) (ST4).

Referring to FIG. 3, under a condition that the lowering operation association signal (lowering operation start command signal) Sdw of the actuator has been input (YES in ST3) and the difference between the lowering-operation actually measured bottom dead center positions Hdwbf and Hdwaf in the two sequential strokes of the slide 5 (the difference is expressed by $\Delta dw$ (=Hdwbf−Hdwaf)) has become equal to or larger than the lowering-operation preset bottom dead center position fluctuation amount ($\Delta dsdw$) (YES in ST5), the selected lower bottom dead center position setting section (31, 33, 34) used in the automatic setting mode is configured to automatically set the lowering-operation actually measured bottom dead center position Hdwaf, which is obtained subsequently, as the selected lower bottom dead center position (ST7).

Note that, the value of the lowering-operation preset bottom dead center position fluctuation amount ($\Delta dsdw$), which is used in the determination of ST5, may be set equal or unequal to the value of a raising-operation preset bottom dead center position fluctuation amount ($\Delta dsup$), which is used in the determination of ST12. The value can be determined depending on the manner of the operation.

The bottom dead center position switching section (31, 33, 34) is configured to switch the target bottom dead center position Hx to the selected bottom dead center position, which is set through use of the touch panel 35, in association with the raising and lowering operation association signal (for example, the raising operation start command signal, the raising operation near-completion signal, or the raising operation completion signal) Sdyc of the actuator.

In this embodiment, the bottom dead center position switching section includes two types of components, specifically, a lowering-operation bottom dead center position switching section and a raising-operation bottom dead center position switching section, which are both capable of automatically switching the bottom dead center position.

Specifically, when the lowering operation association signal (for example, the lowering operation start command signal) Sdw of the actuator has been input (YES in ST3), the lowering-operation bottom dead center position switching section (31, 33, 34), which functions in the automatic setting mode, is configured to switch the target bottom dead center position Hx to the selected lower bottom dead center position Hdwaf (ST8). On the other hand, when the raising operation association signal (for example, the raising operation start command signal) Sup of the actuator has been input (YES in ST10 of FIG. 3), the raising-operation bottom dead center position switching section (31, 33, 34) is configured to switch the target bottom dead center position Hx to the selected higher bottom dead center position Hdwbf (ST13).

Next, the first bottom dead center position correction control section (31, 33, 34) is configured to control, based on the selected bottom dead center position after the switching and the detected bottom dead center position, the positional correction so that the actual bottom dead center position of the slide 5 is adjusted to the selected bottom dead center position. In this embodiment, a correction control execution condition of the bottom dead center position correction control section may be selected.

Specifically, the second bottom dead center position correction control section (31, 33, 34) is configured to: under a state in which the workpiece support unit is lowered from the press working position by the distance corresponding to the predetermined amount or more, based on the selected lower bottom dead center position in place of the target bottom dead center position Hx and on the detected bottom dead center position, control the positional correction so that the actual bottom dead center position of the slide 5 is adjusted to the selected lower bottom dead center position;

and under a state in which the workpiece support unit is raised so as to be returned to the press working position, based on the selected higher bottom dead center position in place of the target bottom dead center position Hx and on the detected bottom dead center position, control the positional correction so that the actual bottom dead center position of the slide 5 is adjusted to the selected higher bottom dead center position.

In this case, the "state in which the workpiece support unit is lowered from the press working position by the distance corresponding to the predetermined amount or more" and the "state in which the workpiece support unit is raised so as to be returned to the press working position" are determined based on the die operation status signal Sdyc output from the die control device 20. Note that, other confirmation units (for example, a limit switch and a proximity switch) may be provided to perform the determination.

The third bottom dead center position correction control section (31, 33, 34) is a system that automatically determines, based on the fluctuation of the bottom dead center position, the "state in which the workpiece support unit is lowered from the press working position by the distance corresponding to the predetermined amount or more" and the "state in which the workpiece support unit is raised so as to be returned to the press working position", which are related to the second bottom dead center position correction control section.

Specifically, the third bottom dead center position correction control section (31, 33, 34) is configured to: when the difference between the lowering-operation actually measured bottom dead center positions Hdwbf and Hdwaf in the two sequential strokes of the slide 5 (the difference is expressed by $\Delta dw$ (=Hdwbf−Hdwaf)) is equal to or larger than the lowering-operation preset bottom dead center position fluctuation amount ($\Delta sdw$) (YES in ST5), based on the selected lower bottom dead center position Hdwaf in place of the target bottom dead center position Hx and on the detected bottom dead center position, control the positional correction so that the actual bottom dead center position of the slide 5 is adjusted to the selected lower bottom dead center position Hdwaf (ST9). The lowering-operation actually measured bottom dead center positions Hdwbf and Hdwaf in the two sequential strokes of the slide 5 are obtained by the first sequential bottom dead center position measuring section (31, 33, 34) (ST4) after the lowering operation association signal (lowering operation start command signal) Sdw is input (YES in ST3).

Further, the third bottom dead center position correction control section (31, 33, 34) is configured to: when the difference between the raising-operation actually measured bottom dead center positions Hupbf and Hupaf in the two sequential strokes of the slide 5 (the difference is expressed by $\Delta up$ (=Hupaf−Hupbf)) is equal to or larger than the raising-operation preset bottom dead center position fluctuation amount ($\Delta dsup$) (YES in ST12), based on the selected higher bottom dead center position Hdwbf in place of the target bottom dead center position Hx (Hdwaf) and on the detected bottom dead center position, control the positional correction so that the actual bottom dead center position of the slide 5 is adjusted to the selected higher bottom dead center position Hdwbf (ST14). The raising-operation bottom dead center position fluctuation amount ($\Delta dsup$) is set in advance through use of the raising-operation bottom dead center position fluctuation amount setting section 35, and is stored and held in the allowable fluctuation amount storage area of the HDD 34. The raising-operation actually measured bottom dead center positions Hupbf and Hupaf in the two sequential strokes of the slide 5 are obtained by a second sequential bottom dead center position measuring section (31, 33, 34) (ST11) after the raising operation association signal (raising operation start command signal) Sup is input (YES in ST10).

Next, operations according to this embodiment are described.

(First Automatic Operation)

The first automatic operation mode is selected in advance through use of the touch panel 35. The selected bottom dead center position setting section 35 is used in the manual setting mode to set the selected bottom dead center position (target bottom dead center position Hx). Specifically, when a press motion is set, the bottom dead center position switching section (31, 33, 34) switches the target value to the target bottom dead center position Hx corresponding to the set press motion (ST1 of FIG. 3). When a correction start command is issued, the third bottom dead center position correction control section (31, 33, 34) functions to control, based on the selected bottom dead center position Hx and the detected bottom dead center position (Spsa, Spsb), the positional correction so that the actual bottom dead center position of the slide 5 is adjusted to the selected bottom dead center position (ST2). The correction is continued until the lowering operation association signal Sdw is input (NO in ST3, ST2). Specifically, the control target bottom dead center position signal Cdv of FIG. 2 corresponding to the press motion is generated and output to the position control unit 15. The slide adjusting motor 12 is driven to rotate based on the drive control signal Sdv output from the position control unit 15 (corresponding to the control target bottom dead center position signal Cdv). The correction of the bottom dead center position is executed (ST2). As indicated on the left end side of FIG. 8, a downward inertial force applied to the slide 5 at the bottom dead center increases along with the increase in press speed, but the fluctuation of the bottom dead center position may be eliminated through the correction control for the bottom dead center. There is no significant fluctuation. Further, when the press speed is stable, there is substantially no fluctuation of the bottom dead center position.

After the lowering operation association signal (lowering operation start command signal) Sdw of the actuator is input from the die control device 20 to the press operation control device 30 (YES in ST3), the first sequential bottom dead center position measuring section (31, 33, 34) obtains the lowering-operation actually measured bottom dead center positions Hdwbf and Hdwaf in the two sequential strokes of the slide 5 (ST4). The slide position signals Spsa and Spsb obtained through the detection by the position sensors 18*a* and 18*b* are subjected to signal processing to obtain the lowering-operation actually measured bottom dead center positions Hdwbf and Hdwaf. Under the condition that the lowering operation association signal (lowering operation start command signal) Sdw has been input (YES in ST3) and the difference ($\Delta dw$) between the lowering-operation actually measured bottom dead center positions Hdwbf and Hdwaf has become equal to or larger than the lowering-operation preset bottom dead center position fluctuation amount ($\Delta dsdw$) (YES in ST5), the selected higher bottom dead center position setting section (31, 33, 34) automatically sets the lowering-operation actually measured bottom dead center position Hdwbf, which is obtained previously, as the selected higher bottom dead center position (ST6). When the difference ($\Delta dw$) between the lowering-operation actually measured bottom dead center positions Hdwbf and Hdwaf is not equal to or larger than the lowering-operation preset bottom dead center position fluctuation amount (Δdsdw), the actual measurement is performed again (NO in ST5, ST4).

That is, at the time of the lowering operation, the target value (Hdwbf), which is then necessary at the time of the raising operation of the actuator, is secured in advance. Thus, the bottom dead center position after the raising operation of the actuator may be corrected based on practical information reflecting various conditions such as the characteristics of the press machine 1, the properties of the product, and the manner of the operation, and hence the quality of the product may be kept high. The automatic determination of the target value leads to easy handling and high work efficiency.

Simultaneously, under the condition that the lowering operation association signal (lowering operation start command signal) Sdw has been input (YES in ST3) and the difference (Δdw) between the lowering-operation actually measured bottom dead center positions Hdwbf and Hdwaf has become equal to or larger than the lowering-operation preset bottom dead center position fluctuation amount (Δdsdw) (YES in ST5), the selected lower bottom dead center position setting section (31, 33, 34) automatically sets the lowering-operation actually measured bottom dead center position Hdwaf, which is obtained subsequently, as the selected lower bottom dead center position (ST7).

Figure 8:
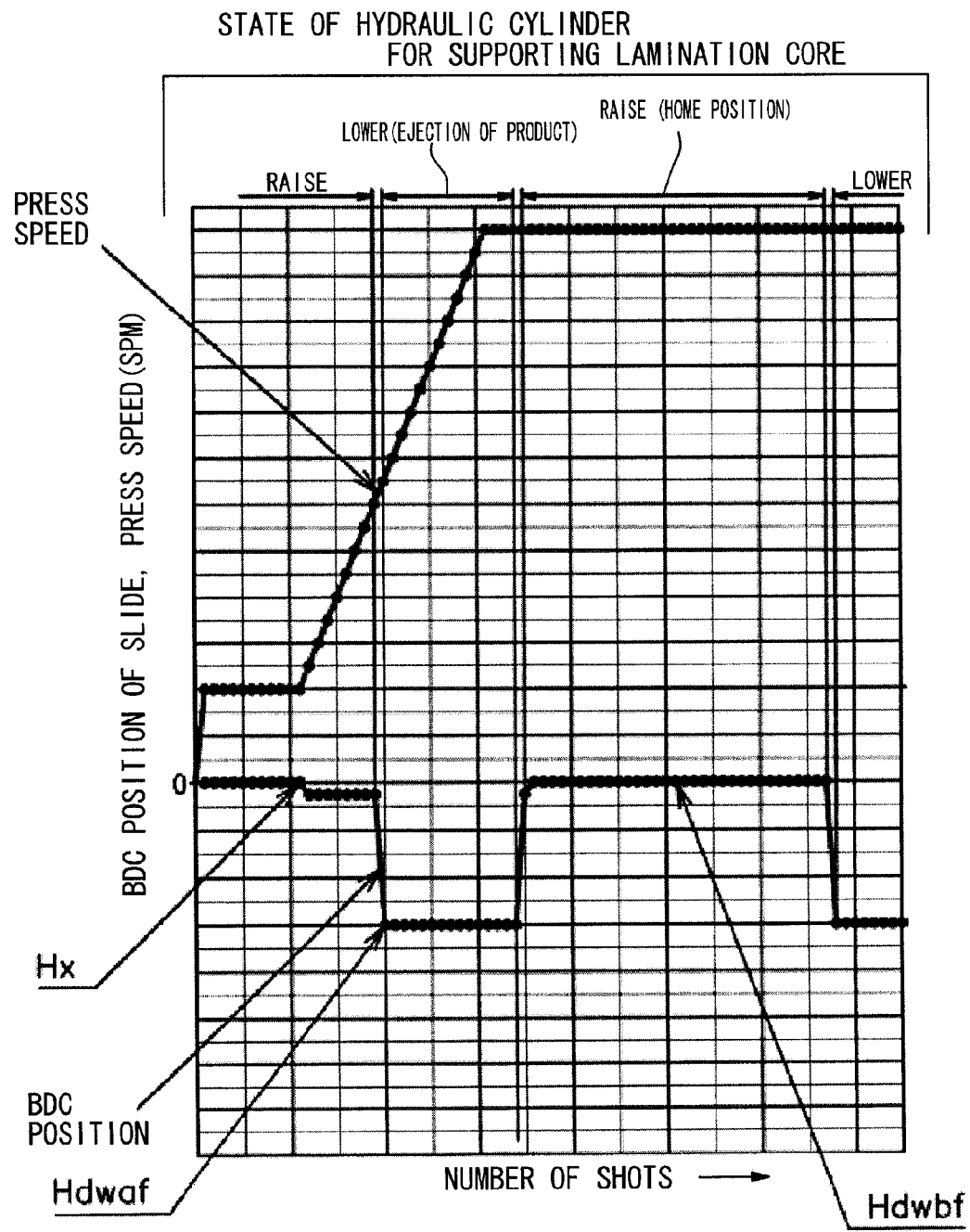
FIG. 8 is an explanatory timing chart illustrating an operation of correcting the bottom dead center position on a cycle-shot basis.
Figure 9A:
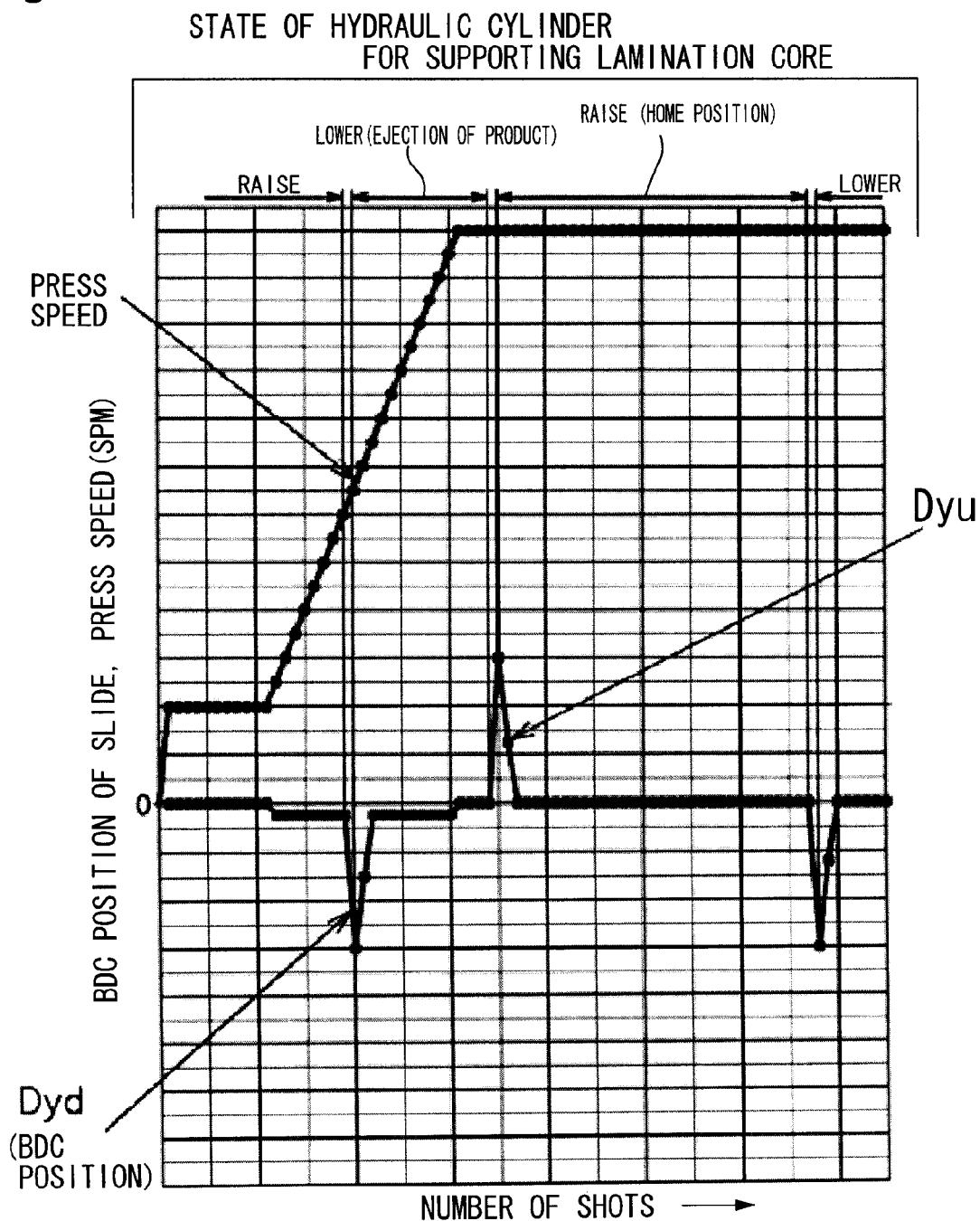
FIG. 9A is an explanatory timing chart illustrating an operation of correcting the bottom dead center position during an accelerated press operation at a stage at which tests and studies are conducted to arrive at the present invention.
Figure 9B:
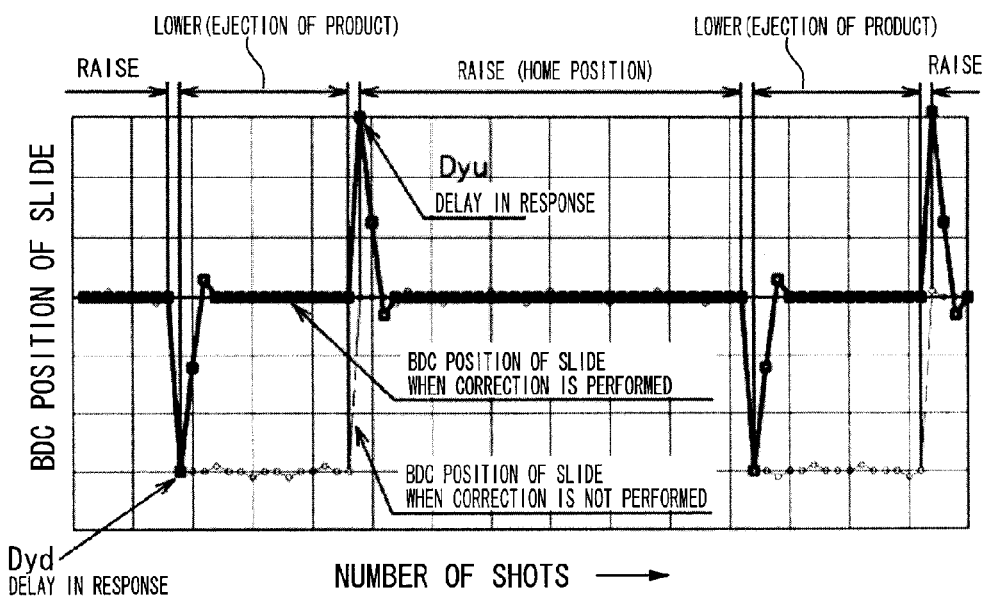
FIG. 9B is an explanatory timing chart illustrating the operation of correcting the bottom dead center position during a constant-speed press operation at the stage at which the tests and studies are conducted to arrive at the present invention.
Figure 10:
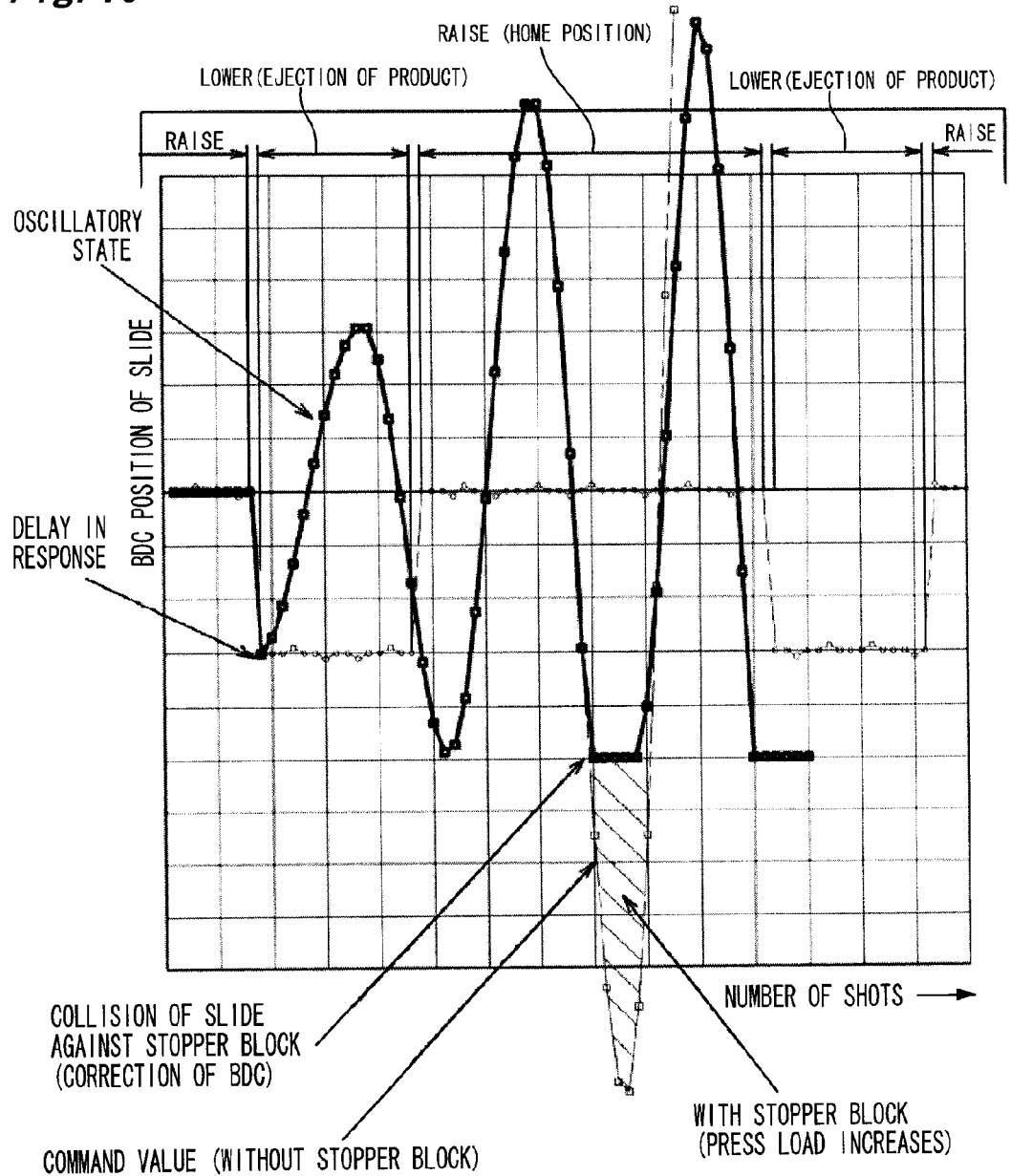
FIG. 10 is an explanatory timing chart illustrating an operation of correcting the bottom dead center position at the stage at which the tests and studies are conducted to arrive at the present invention.
Figure 11:
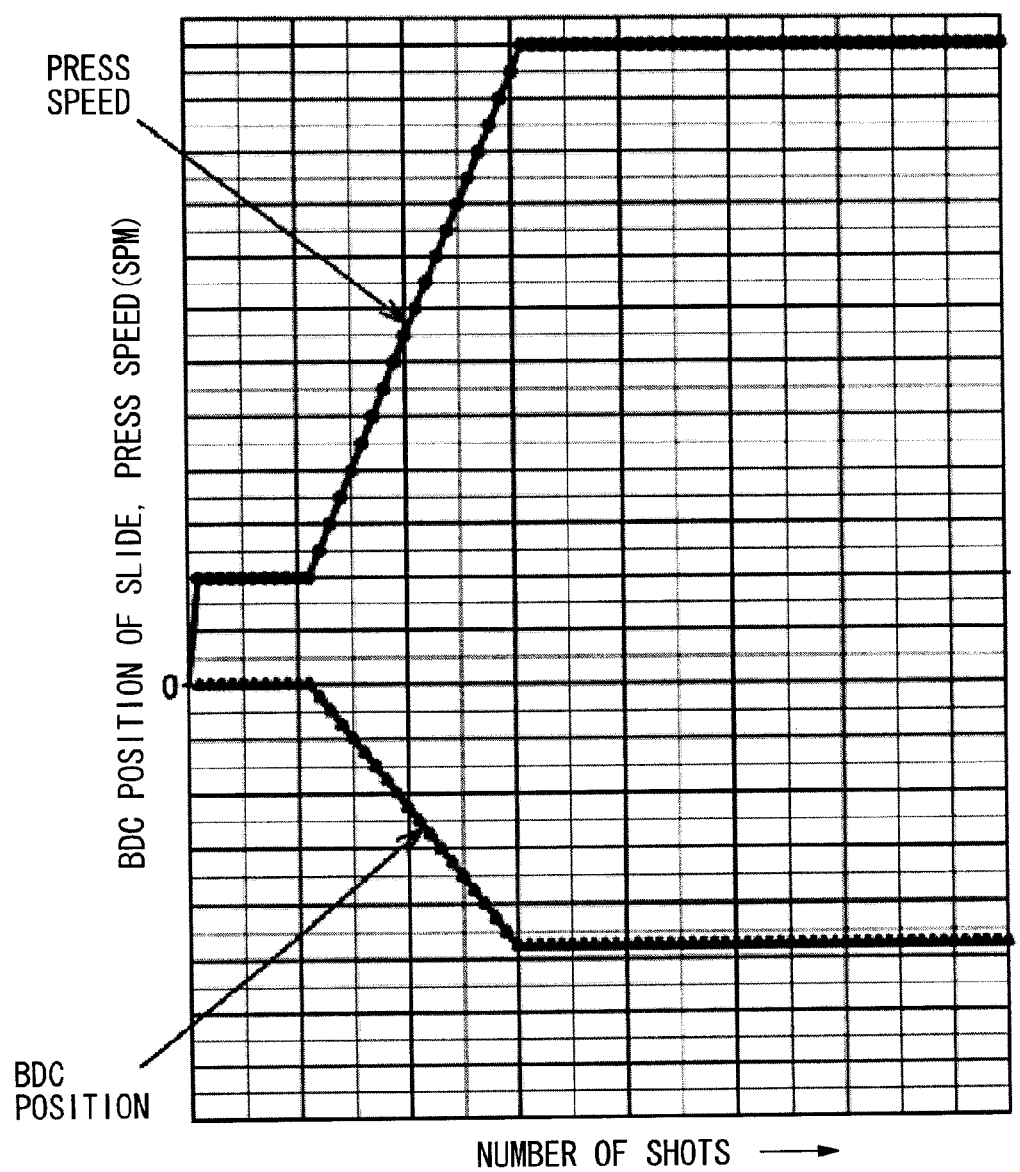
FIG. 11 is an explanatory timing chart illustrating a fluctuation of the bottom dead center position during the accelerated press operation according to a conventional example without an actuator.
Figure 12A:
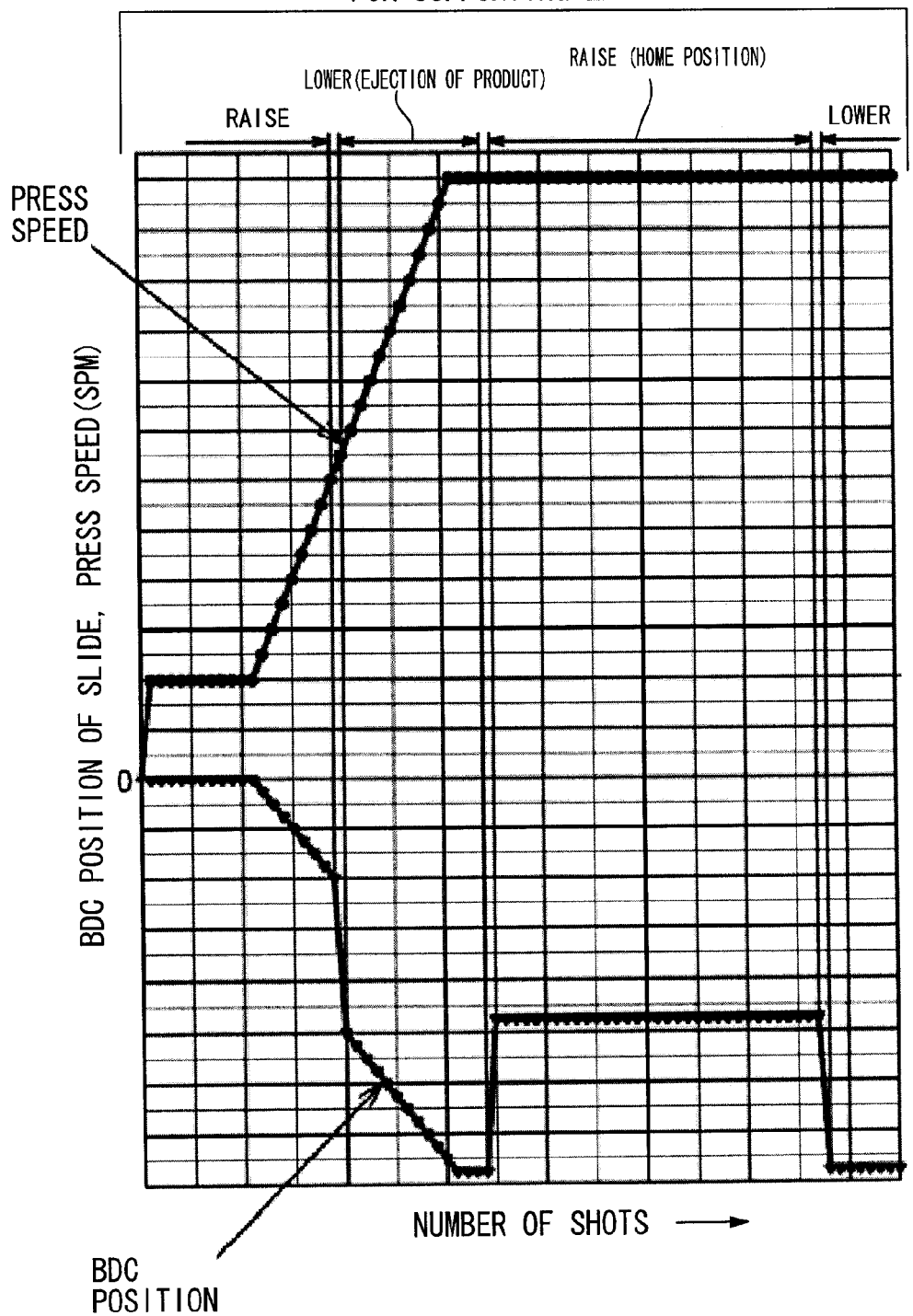
FIG. 12A is an explanatory timing chart illustrating a fluctuation of the bottom dead center position mainly during the accelerated press operation according to a conventional example with an actuator.
Figure 12B:
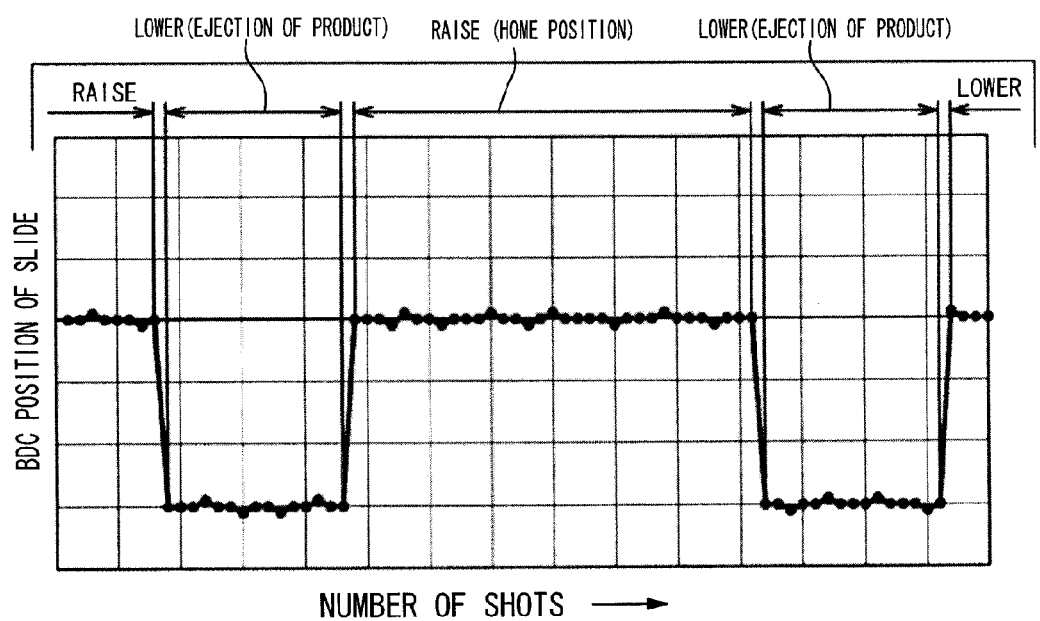
FIG. 12B is an explanatory timing chart illustrating a fluctuation of the bottom dead center position during the constant-speed press operation according to the conventional example with an actuator.

The lowering operation association signal (lowering operation start command signal) Sdw of the actuator has been input (YES in ST3), and hence the lowering-operation bottom dead center position switching section (31, 33, 34) then switches the target bottom dead center position Hx to the selected lower bottom dead center position Hdwaf (ST8). The third bottom dead center position correction control section (31, 33, 34) continuously executes, based on the selected lower bottom dead center position Hdwaf and the detected bottom dead center position (Spsa, Spsb), the correction of the bottom dead center position so that the actual bottom dead center position of the slide 5 is adjusted to the selected lower bottom dead center position Hdwaf (ST9). As illustrated in FIG. 8, when the workpiece support unit is lowered in the direction of the product ejecting position by the actuator, the receiving force generated by the actuator against the punch when the lamination core is punched and crimped is eliminated, and hence the bottom dead center position is lowered significantly. However, the control target value is switched to the selected lower bottom dead center position Hdwaf corresponding to the position after the lowering operation, and hence stable correction control for the bottom dead center position is ensured. That is, as illustrated in FIG. 8, it is possible to clear the significant time delay Dyd illustrated in FIGS. 9A and 9B corresponding to FIG. 8.

After the product (having the lamination cores laminated at a predetermined lamination thickness) is ejected from the die, the raising operation association signal (raising operation start command signal) Sup is input from the die control device 20 to the press operation control device 30 so as to return the actuator (workpiece support unit) to the press working position (YES in ST10), and then the actuator (hydraulic cylinder) is pressurized and raised. The second sequential bottom dead center position measuring section (31, 33, 34) obtains the raising-operation actually measured bottom dead center positions Hupbf and Hupaf in the two sequential strokes of the slide 5 (ST11). When the difference (Δup) between the raising-operation actually measured bottom dead center positions Hupbf and Hupaf is equal to or larger than the raising-operation preset bottom dead center position fluctuation amount (Δdsup) (YES in ST12), the target bottom dead center position (Hdwaf←Hx) is switched to the selected higher bottom dead center position Hdwbf. Note that, the correction is continued until the raising operation association signal Sup is input (NO in ST10, ST9). Further, when the difference (Δup) between the raising-operation actually measured bottom dead center positions Hupbf and Hupaf is not equal to or larger than the raising-operation preset bottom dead center position fluctuation amount (Δdsup), the actual measurement is performed again (NO in ST12, ST11).

The receiving force is generated by the actuator (hydraulic cylinder) against the punch when the lamination core is punched and crimped, and the bottom dead center position is raised significantly as illustrated in FIG. 8. However, the bottom dead center position is returned from the product ejecting position (Hdwaf), which is lowered by the predetermined amount or more due to the previous lowering operation of the workpiece support unit (actuator), to the press working position (Hdwbf) before the workpiece support unit (actuator) is lowered, but it is understood that the bottom dead center position is not raised significantly beyond the press working position (Hdwbf).

Specifically, the third bottom dead center position correction control section (31, 33, 34) performs, based on the selected higher bottom dead center position Hdwbf in place of the target bottom dead center position (Hdwaf) and on the detected bottom dead center position, the positional correction so that the actual bottom dead center position of the slide 5 is adjusted to the selected higher bottom dead center position Hdwbf (ST14). It is possible to clear the significant time delay Dyu illustrated in FIGS. 9A and 9B.

Subsequently, when there is a request to temporarily set the current position back to the target bottom dead center position Hx (YES in ST15), the processing returns to ST1, and when there is no such request (NO in ST15), the processing returns to ST3.

(Second Automatic Operation)

The second automatic operation mode is selected through use of the touch panel 35. The second automatic operation is different from the first automatic operation in that the second bottom dead center position correction control section (31, 33, 34) is executed. Specifically, the second bottom dead center position correction control section (31, 33, 34) used in the second automatic operation controls the positional correction by using the selected lower bottom dead center position under the state in which the workpiece support unit is lowered from the press working position by the distance corresponding to the predetermined amount or more, and controls the positional correction by using the selected higher bottom dead center position under the state in which the workpiece support unit is raised so as to be returned to the press working position. Thus, as compared to the first automatic operation, the second bottom dead center position correction control section (31, 33, 34) may be configured to confirm the position based on the die operation status signal Sdyc (lowering operation association signal Sdw and raising operation association signal Sup) output from the die control device 20, and also detect the position of the workpiece support unit in a simple manner through use of the above-mentioned limit switch and the like. That is, there is an advantage of higher adaptability of confirmation to the execution condition of the bottom dead center position correction control section.

(Manual Operation)

The manual operation mode is selected through use of the touch panel 35. The selected bottom dead center position setting section 35 is used to set the selected bottom dead center position. The selected bottom dead center position setting section 35 may serve as the selected higher bottom dead center position setting section 35 to set the higher bottom dead center position, and may serve as the selected lower bottom dead center position setting section 35 to set the lower bottom dead center position. In this case, the lower bottom dead center position is restricted by the stopper block, and hence only the higher bottom dead center position is set. The raising-operation bottom dead center position switching section (31, 33, 34) functions as the bottom dead center position switching section. Specifically, when the raising operation association signal (raising operation start command signal) Sup of the actuator is input from the die control device 20, the raising-operation bottom dead center position switching section (31, 33, 34) switches the target bottom dead center position Hx to the selected higher bottom dead center position thus set. The first bottom dead center position correction control section (31, 33, 34) performs, based on the selected higher bottom dead center position after the switching and the detected bottom dead center position (Spsa, Spsb) obtained during the press operation, the positional correction so that the actual bottom dead center position of the slide 5 is adjusted to the selected higher bottom dead center position. Thus, it is possible to prevent the abrupt and excessive upward fluctuation of the bottom dead center position that occurs due to the raising operation of the actuator.

In a case where the stopper block is not provided, the selected lower bottom dead center position setting section 35 is also used to set the lower bottom dead center position, and the lowering-operation bottom dead center position switching section (31, 33, 34) is also caused to function. Thus, it is possible to prevent the abrupt and excessive fluctuations of the bottom dead center position that occur due to the lowering operation of the actuator as well as the raising operation thereof.

As described above, according to this embodiment, the selected bottom dead center position setting section 35 and the bottom dead center position switching section 35 are provided, and the first bottom dead center position correction control section (31, 33, 34) is configured to perform, based on the selected bottom dead center position after the switching and the detected bottom dead center position, the positional correction so that the actual bottom dead center position of the slide 5 is adjusted to the selected bottom dead center position. Thus, it is possible to eliminate the abrupt and excessive rise of the actual bottom dead center position that occurs along with the lowering and raising operations of the actuator ("Dyu" of FIGS. 9A and 9B). That is, it is possible to manufacture a high-quality product.

The second bottom dead center position correction control section (31, 33, 34) is capable of performing the positional correction based on the selected lower bottom dead center position under the state in which the workpiece support unit is lowered by the distance corresponding to the predetermined amount or more, and performing the positional correction based on the selected higher bottom dead center position under the state in which the workpiece support unit is raised so as to be returned to the press working position. Thus, it is possible to eliminate the abrupt and excessive rise of the actual bottom dead center position that occurs along with the raising operation of the actuator ("Dyu" of FIGS. 9A and 9B). That is, the depth of the crimping projections and depressions may be maintained as originally intended, and hence the crimping may be performed sufficiently. In other words, a high-quality product may be manufactured.

Further, the correction control is continued also when the actuator is lowered, and hence the bottom dead center position may be maintained stably even without the stopper block.

The third bottom dead center position correction control section (31, 33, 34) is capable of performing the positional correction based on the selected lower bottom dead center position when the difference (Δdw) between the lowering-operation actually measured bottom dead center positions in the two sequential strokes of the slide 5 is equal to or larger than the lowering-operation preset bottom dead center position fluctuation amount (Δdsdw), and performing the positional correction based on the selected higher bottom dead center position when the difference (Δup) between the raising-operation actually measured bottom dead center positions is equal to or larger than the raising-operation preset bottom dead center position fluctuation amount (Δdsup). Thus, a higher control response speed may be obtained, with the result that a higher-quality product may be manufactured.

It is possible to reliably prevent the abrupt and excessive rise of the actual bottom dead center position that occurs due to the raising operation of the actuator ("Dyu" of FIGS. 9A and 9B), and therefore to maintain a constant fitting and crimping pressure. The thin plates are not separated from each other.

Even in the case where the stopper block is provided in the die, it is possible to prevent the significant bounce of the slide 5 due to the considerable increase in amount of abutment of the slide 5 against the stopper block, the deterioration in precision of the product, and the reduction in life of the die. The present invention is also effective in preventing the overload on the press machine.

Further, under the condition that the lowering operation association signal of the actuator has been input and the difference (Δdw) between the lowering-operation actually measured bottom dead center positions in the two sequential strokes of the slide 5 has become equal to or larger than the lowering-operation preset bottom dead center position fluctuation amount (Δdsdw), the selected higher bottom dead center position setting section (31, 33, 34) is capable of automatically setting the lowering-operation actually measured bottom dead center position Hdwbf, which is obtained previously, as the selected higher bottom dead center position. Thus, the bottom dead center position at the time of the raising operation of the actuator may be corrected to be an optimum bottom dead center position that is suited to the characteristics of the press machine 1 and the manner of the press operation.

Further, under the condition that the lowering operation association signal of the actuator has been input and the difference (Δdw) between the lowering-operation actually measured bottom dead center positions in the two sequential strokes of the slide has become equal to or larger than the lowering-operation preset bottom dead center position fluctuation amount (Δdsdw), the selected lower bottom dead center position setting section (31, 33, 34) is capable of automatically setting the lowering-operation actually measured bottom dead center position Hdwbf, which is obtained subsequently, as the selected lower bottom dead center position. Thus, the bottom dead center position at the time of the lowering operation of the actuator may be corrected to be an optimum bottom dead center position that is suited to the characteristics of the press machine and the manner of the press operation.

When the selected higher bottom dead center position is set as the position lower than the target bottom dead center position, the bottom dead center position at the time of the raising operation of the actuator may be corrected to be a bottom dead center position that is lower than the target bottom dead center position and suited to the manner of the press operation.

The embodiment described above is a mere illustration for the description of the present invention. Therefore, various changes are possible without departing from the scope of the present invention.

What is claimed is:

1. A press machine including an actuator capable of lowering a workpiece support unit from a press working position by a distance corresponding to a predetermined amount or more, and raising the workpiece support unit so as to be returned to the press working position after ejecting a workpiece, the press machine comprising:
   a bottom dead center position correction control section, which performs, based on a preset target bottom dead center position and a detected bottom dead center position obtained during a press operation, positional correction so that an actual bottom dead center position of a slide is adjusted to the preset target bottom dead center position;
   a selected bottom dead center position setting section, which sets a selected bottom dead center position selected as a position lower than the preset target bottom dead center position; and
   a bottom dead center position switching section, which switches the preset target bottom dead center position to the selected bottom dead center position in association with a raising and lowering operation association signal of the actuator,
   wherein the bottom dead center position correction control section is configured to perform, based on the selected bottom dead center position after the switching and the detected bottom dead center position, positional correction so that the actual bottom dead center position of the slide is adjusted to the selected bottom dead center position.

2. A press machine including an actuator capable of lowering a workpiece support unit from a press working position by a distance corresponding to a predetermined amount or more, and raising the workpiece support unit so as to be returned to the press working position after ejecting a workpiece, the press machine comprising:
   a bottom dead center position correction control section, which performs, based on a preset target bottom dead center position and a detected bottom dead center position obtained during a press operation, positional correction so that an actual bottom dead center position of a slide is adjusted to the preset target bottom dead center position;
   a selected lower bottom dead center position setting section, which sets a selected lower bottom dead center position selected as a position lower than the preset target bottom dead center position;
   a selected higher bottom dead center position setting section, which sets a selected higher bottom dead center position selected as a position higher than the selected lower bottom dead center position;
   a lowering-operation bottom dead center position switching section, which switches the preset target bottom dead center position to the selected lower bottom dead center position when a lowering operation association signal of the actuator is input; and
   a raising-operation bottom dead center position switching section, which switches the preset target bottom dead center position to the selected higher bottom dead center position when a raising operation association signal of the actuator is input,
   wherein the bottom dead center position correction control section is configured to:
   under a state in which the workpiece support unit is lowered from the press working position by the distance corresponding to the predetermined amount or more, based on the selected lower bottom dead center position in place of the preset target bottom dead center position and on the detected bottom dead center position, perform positional correction so that the actual bottom dead center position of the slide is adjusted to the selected lower bottom dead center position; and
   under a state in which the workpiece support unit is raised so as to be returned to the press working position, based on the selected higher bottom dead center position in place of the preset target bottom dead center position and on the detected bottom dead center position, perform positional correction so that the actual bottom dead center position of the slide is adjusted to the selected higher bottom dead center position.

3. A press machine according to claim 2, wherein, under a condition that the lowering operation association signal of the actuator has been input and the difference between lowering-operation actually measured bottom dead center positions in two sequential strokes of the slide has become equal to or larger than a lowering-operation preset bottom dead center position fluctuation amount, the selected higher bottom dead center position setting section is capable of automatically setting one of the lowering-operation actually measured bottom dead center positions, which is obtained previously, as the selected higher bottom dead center position.

4. A press machine according to claim 2, wherein, under a condition that the lowering operation association signal of the actuator has been input and the difference between lowering-operation actually measured bottom dead center positions in two sequential strokes of the slide has become equal to or larger than a lowering-operation preset bottom dead center position fluctuation amount, the selected lower bottom dead center position setting section is capable of automatically setting one of the lowering-operation actually measured bottom dead center positions, which is obtained subsequently, as the selected lower bottom dead center position.

5. A press machine according to claim 2, wherein the selected higher bottom dead center position comprises a position lower than the preset target bottom dead center position.

* * * * *